US008004732B2

(12) United States Patent
Sakaue

(10) Patent No.: US 8,004,732 B2
(45) Date of Patent: Aug. 23, 2011

(54) IMAGE PROCESSING APPARATUS AND METHOD THEREOF

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 853 days.

(21) Appl. No.: 11/997,216

(22) PCT Filed: Aug. 29, 2006

(86) PCT No.: PCT/JP2006/317417
§ 371 (c)(1),
(2), (4) Date: Jan. 29, 2008

(87) PCT Pub. No.: WO2007/026924
PCT Pub. Date: Mar. 8, 2007

(65) Prior Publication Data
US 2010/0092092 A1    Apr. 15, 2010

(30) Foreign Application Priority Data

Aug. 31, 2005 (JP) ................................. 2005-252466

(51) Int. Cl.
H04N 1/46 (2006.01)
(52) U.S. Cl. ........................................ 358/534; 382/199
(58) Field of Classification Search .................... 358/534
See application file for complete search history.

(56) References Cited

U.S. PATENT DOCUMENTS

| 4,782,398 | A | * | 11/1988 | Mita | 358/443 |
|---|---|---|---|---|---|
| 4,958,218 | A | * | 9/1990 | Katayama et al. | 358/530 |
| 5,212,740 | A | * | 5/1993 | Paek et al. | 382/266 |
| 5,491,564 | A | * | 2/1996 | Hongu | 382/238 |
| 5,548,415 | A | * | 8/1996 | Tanaka et al. | 358/462 |
| 7,817,859 | B2 | * | 10/2010 | Lee | 382/199 |
| 2002/0039444 | A1 | * | 4/2002 | Yamagata et al. | 382/199 |
| 2002/0057464 | A1 | * | 5/2002 | Hashimoto et al. | 358/462 |
| 2002/0126315 | A1 | * | 9/2002 | Nabeshima | 358/3.03 |
| 2003/0118234 | A1 | * | 6/2003 | Tanaka et al. | 382/173 |
| 2004/0125409 | A1 | * | 7/2004 | Yamaguchi et al. | 358/2.1 |
| 2005/0036687 | A1 | | 2/2005 | Ishiguro | 382/194 |
| 2005/0270582 | A1 | * | 12/2005 | Hara | 358/2.1 |
| 2007/0071334 | A1 | | 3/2007 | Sakaue | 382/239 |
| 2010/0092092 | A1 | * | 4/2010 | Sakaue | 382/200 |

FOREIGN PATENT DOCUMENTS

| JP | 3240365 | 10/1991 |
|---|---|---|
| JP | 7212578 | 8/1995 |
| JP | 11085978 | 3/1999 |

(Continued)

OTHER PUBLICATIONS

European Communication and Serach Report dated Sep. 11, 2009, regarding Application No. 06797342.0.

*Primary Examiner* — Sath V Perungavoor

(74) *Attorney, Agent, or Firm* — Fitzpatrick, Cella, Harper & Scinto

(57) ABSTRACT

When a halftone dot region includes a character or line drawing, high extraction performance of a halftone dot region cannot be obtained. Hence, the isolation amount of a pixel of interest is calculated, and the isolation amounts are integrated in a plurality of areas having different sizes. Thresholds set for respective areas are compared with the integration result to determine whether or not the pixel of interest belongs to a halftone dot region.

6 Claims, 28 Drawing Sheets

FOREIGN PATENT DOCUMENTS

| | | |
|---|---|---|
| JP | 2001245142 | 9/2001 |
| JP | 2003032483 | 1/2003 |
| JP | 2003244432 | 8/2003 |
| JP | 2004007049 | 1/2004 |
| JP | 2004254032 | 9/2004 |
| JP | 2004282324 | 10/2004 |
| JP | 2005045506 | 2/2005 |

* cited by examiner

F I G. 14A
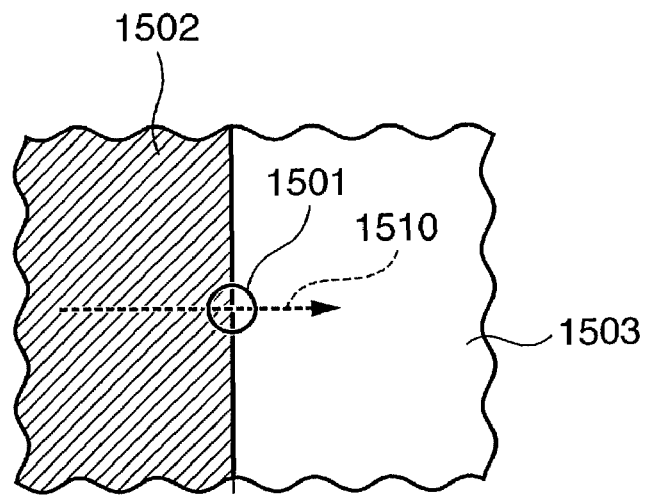
F I G. 14B
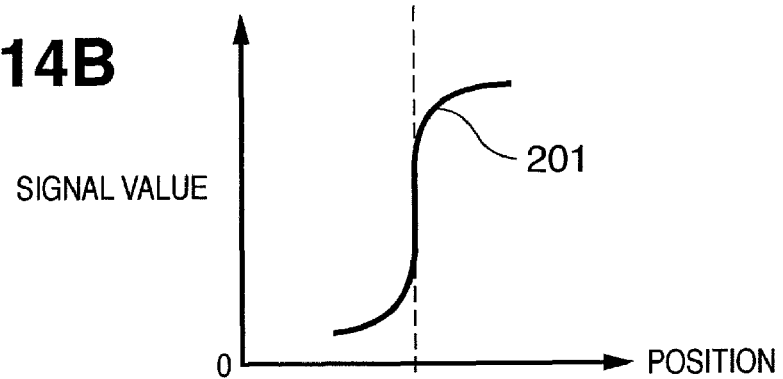
F I G. 14C
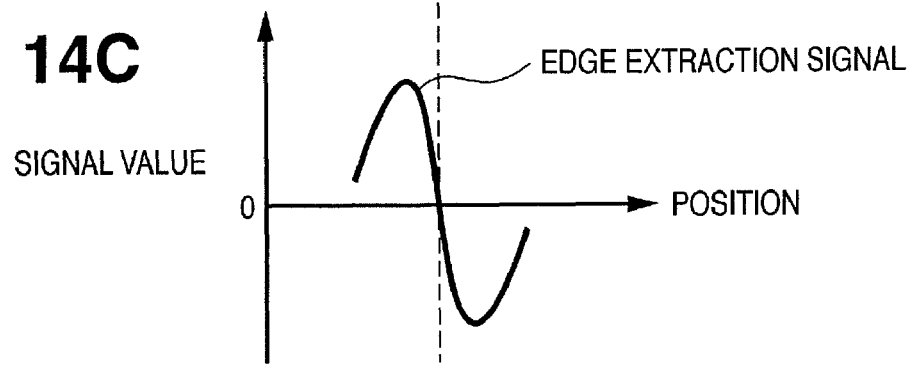

FIG. 16

| INNER EDGE DETERMINATION SIGNAL | 0 | 0 | 0 | 0 | 1 | 1 | 1 | 1 |
| --- | --- | --- | --- | --- | --- | --- | --- | --- |
| INNER EDGE EXPANSION SIGNAL | 0 | 0 | 1 | 1 | 1 | 0 | 1 | 1 |
| OUTER EDGE EXPANSION SIGNAL | 0 | 1 | 0 | 1 | 0 | 1 | 0 | 1 |
| TEXT SIGNAL | 0 | 0 | 1 | 0 | 1 | 1 | 1 | 1 |

F I G. 19A
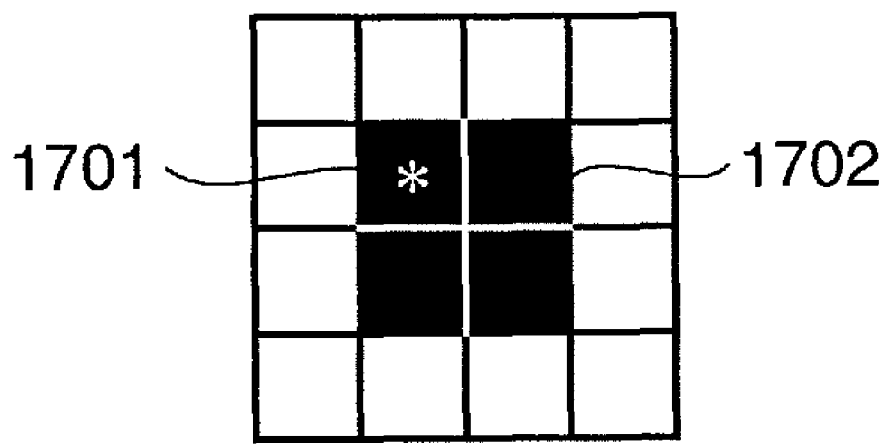
F I G. 19B
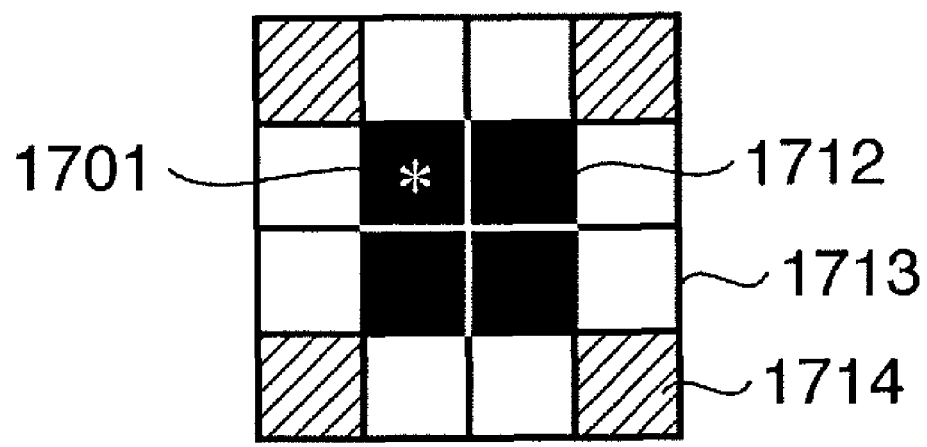

IMAGE PROCESSING APPARATUS AND METHOD THEREOF

TECHNICAL FIELD

The present invention relates to image processing for extracting an image region from an image including different types of image regions.

BACKGROUND ART

As a method of applying optimal image processing according to features of an image, a method of extracting a character edge using a differential filter or the like to segment an image region into a text region and other regions, and then applying adaptive processing is known. Also, a method of extracting a halftone dot region by defining a dot as an isolation amount and integrating isolation amounts within a predetermined area, so as to segment an image region into a text region and the halftone dot region, and then applying adaptive processing is known (for example, see Japanese Patent Laid-Open No. 11-85978).

The aforementioned region extraction technique exhibits high extraction performance for a halftone dot region that expresses a character, photo, or the like in a white background. However, the extraction performance of a halftone dot region when a character, line drawing, or the like is present within the halftone dot region is not so high. Especially, it is very difficult to extract a low-density halftone dot region including a character or line drawing.

Extraction errors increase if processing is changed in a direction to make it easy to extract dots in order to improve the extraction performance of a halftone dot region. Also, a method of avoiding the influence of a character or line drawing by enlarging an area in which isolation amounts are integrated may be used. However, at the boundary of a halftone dot region that contacts a white background, the extraction result of the halftone dot region undesirably enlarges (the extraction result balloons).

DISCLOSURE OF INVENTION

One aspect of the present invention discloses a method of extracting image regions from an image including different types of image regions, comprising the steps of:
calculating an isolation amount of an interest pixel;
integrating the isolation amounts in a plurality of areas having different sizes; and
determining whether or not the interest pixel belongs to a halftone dot region by comparing thresholds set for the respective plurality of areas and the integration result.

According to the present invention, a halftone dot region including a character, line drawing, or the like can be correctly detected. Also, ballooning of the extraction result which occurs at the boundary of a halftone dot region can be prevented.

Further features of the present invention will become apparent from the following description of exemplary embodiments with reference to the attached drawings.

BRIEF DESCRIPTION OF DRAWINGS

FIGS. 14A to 14C are views for explaining the processing of an edge emphasizer;

FIG. 16 shows a table configuration of an LUT;

FIGS. 19A and 19B are views for explaining matching patterns used in isolation amount determination;

BEST MODE FOR CARRYING OUT THE INVENTION

Image processing according to an embodiment of the present invention will be described in detail hereinafter with reference to the accompanying drawings.

First Embodiment

Arrangement of Processing

Figure 1:
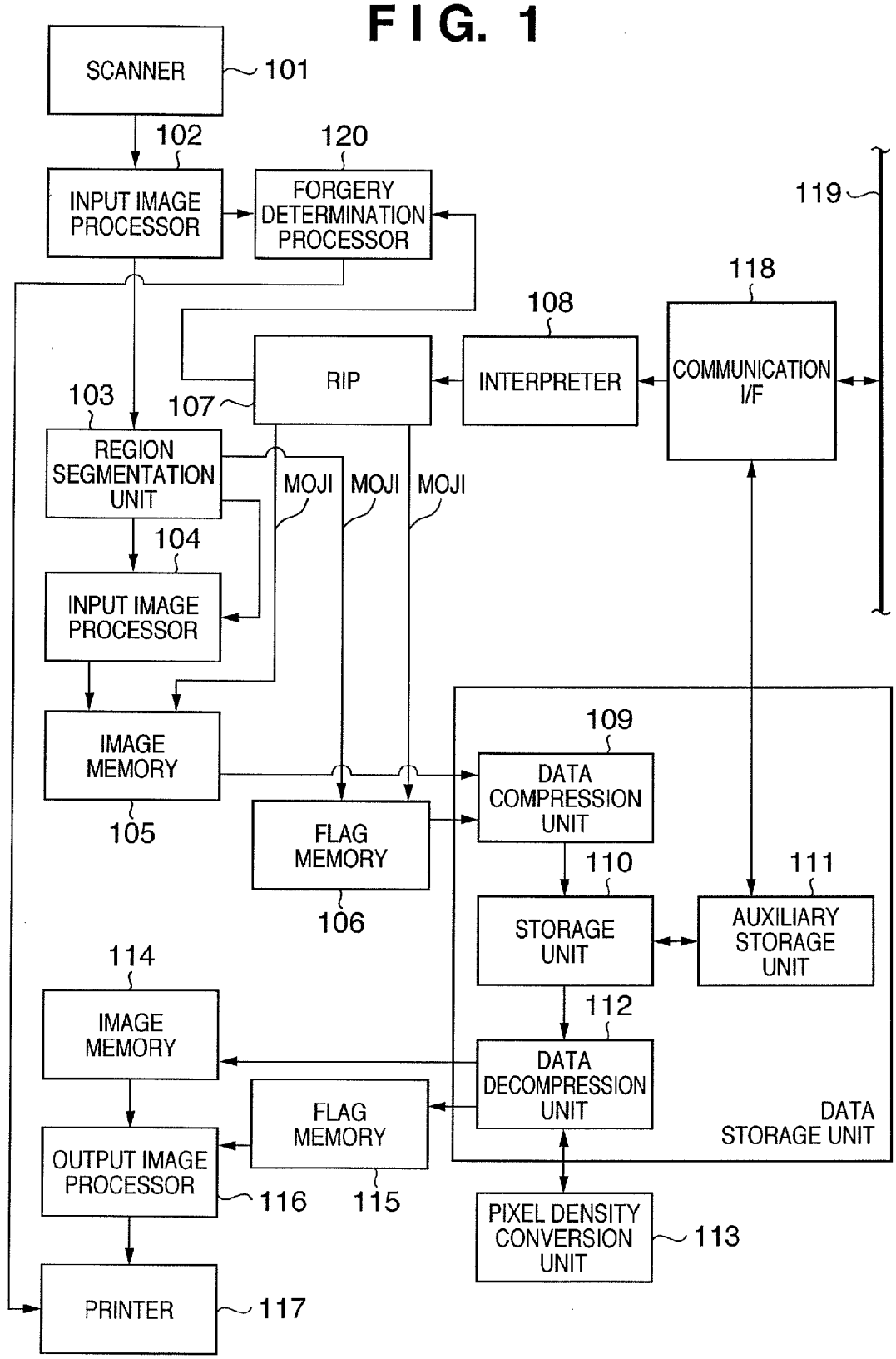
FIG. 1 is a block diagram for explaining the arrangement of image processing according to an embodiment of the present invention.

FIG. 1 is a block diagram for explaining the arrangement of image processing according to this embodiment.

Processing of Scanned Image

A scanner 101 scans an image of an original placed on an original platen glass. The scanner 101 digitally scans an original image for respective pixels using a 3-line CCD, and outputs its RGB color image signal. An input image processor 102 applies known image processing such as shading correction, CCD inter-line correction, color correction, and the like to the color image signal output from the scanner 101.

A region segmentation unit 103 applies region segmentation processing to the color image signal which has undergone the input image processing and is output from the input image processor 102. The region segmentation unit 103 detects features of images such as a photo region, a text region, a halftone dot region, and so forth, for respective pixels of the input image, and generates flag data indicating attributes for respective image regions.

An input image processor 104 applies image processing for each pixel to the color image signal output from the input image processor 102 based on a text signal MOJI which is output for each pixel from the region segmentation unit 103. The input image processor 104 applies the following processing for each pixel: processing for emphasizing the sharpness of a character by emphasizing high-frequency components of a text region (MOJI='1'), and processing for removing moiré components unique to a digital image by applying so-called low-pass filter processing to a halftone dot region (MOJI='0').

The image data processed by the input image processor 104 is temporarily stored in an image memory 105, and the flag data output from the region segmentation unit 103 are temporarily stored in a flag memory 106. The image memory 105 and flag memory 106 store data for one page of an original document or for a predetermined size (band size) of one page.

A data compression unit 109 compresses the data temporarily stored in the image memory 105 and flag memory 106 and stores the compressed data in a storage unit 110. The storage unit 110 preferably comprises a memory such as a semiconductor memory which has a high read/write speed. The data compression unit 109 compresses the image data and flag data by different data compression methods. To the image data, the data compression unit 109 applies lossy compression, such as JPEG, but high-efficiency compression can obscure image deterioration in consideration of the human visual characteristics. On the other hand, to the flag data, the data compression unit 109 uses lossless compression such as JBIG so as to prevent attribute information from being omitted or changed.

In this manner, the storage unit 110 stores the image data and flag data, which are compressed by the different compression methods, for each page of the original image. Note that all or some of the data stored in the storage unit 110 are often read out to an auxiliary storage unit 111. The auxiliary storage unit 111 preferably comprises a storage medium like a hard disk, which has a slightly low read/write speed but has a large capacity. Using the auxiliary storage unit 111, a large number of pages of original images can be efficiently integrated.

When an image stored in the storage unit 110 or auxiliary storage unit 111 is to be printed by a printer 117, the image data and flag data are read out from these storage units. The image data and flag data are decompressed by a data decompression unit 112, and the decompressed image data and flag data are respectively stored in an image memory 114 and flag memory 115. At this time, a pixel density conversion unit 113 often converts the pixel density of the image data. For example, the pixel density is converted when an image stored in the storage unit 110 is to be printed in an enlarged or reduced scale or when stored images for a plurality of pages are to be combined and printed on a single print sheet.

Figure 7:
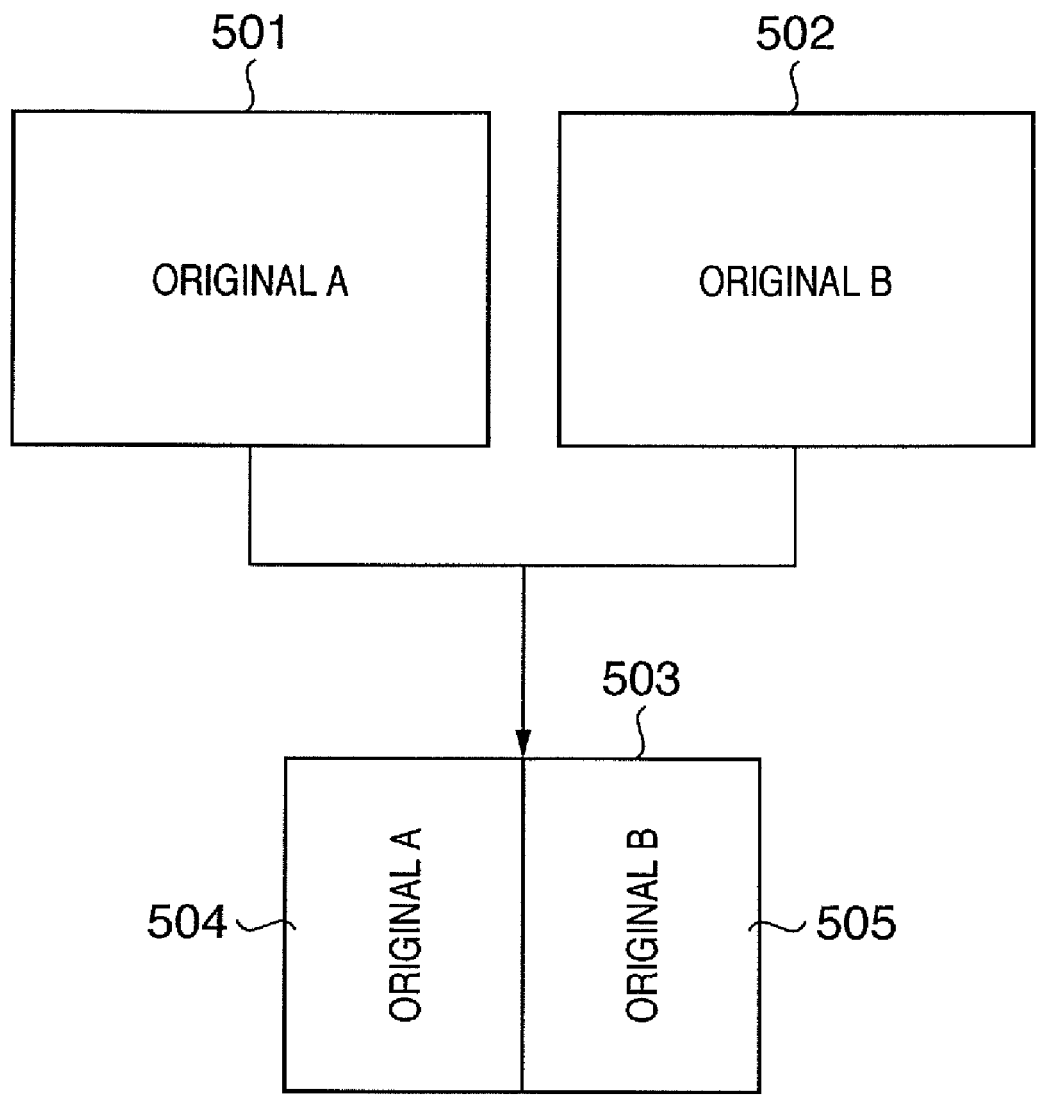
FIG. 7 shows a state wherein images for a plurality of pages are combined and printed.

FIG. 7 shows a state in which images for a plurality of pages are to be combined and printed. Two images 501 and 502 are stored in the storage unit 110, and are combined and printed on a print sheet 503 having the same size as an original. For this purpose, image data of the image 501 is read out from the storage unit 110 and decompressed, and is reduced to a predetermined scale by the pixel density conversion unit 113. Furthermore, the image data is rotated counterclockwise through 90° by a rotation processor (not shown), and is written in a predetermined area (an area 504 in FIG. 7) of the image memory 114. Next, image data of the image 502 is read out from the storage unit 110, and is written in a predetermined area (an area 505 in FIG. 7) of the image memory 114 after it has similarly undergone decompression, resolution conversion, and rotation.

In this case, flag data corresponding to the images 501 and 502 are also written in corresponding areas of the flag memory 115 after they have similarly undergone readout, decompression, resolution conversion, and rotation.

Note that the image data and flag data preferably undergo resolution conversion based on different methods. For example, a known method such as linear interpolation, interpolation by bicubic splines, or the like is applied to the image data. Also, a resolution conversion method suited to binary data such as a nearest-neighbor algorithm or the like is desirably used for the flag data.

An output image processor 116 receives image data and flag data when the image data and flag data stored in the image memory 114 and flag memory 115 reach predetermined stored data sizes, as will be described in detail later. The output image processor 116 performs known image processing required to convert RGB image data input from the image memory 114 into a print image signal, i.e., RGB to CMYK conversion, gamma correction, binarization processing, and the like, and outputs a processed CMYK image signal.

The printer 117 forms and outputs a visible image on a print sheet by driving a laser beam or ink-jet head based on the CMYK image signal output from the output image processor 116. Note that the flag data stored in the flag memory 115 are used to switch the processing contents of the output image processor 116.

Processing of Received Image

A communication interface (I/F) 118 receives a print job from an external communication path 119 such as a local area network (LAN) or the like. Representative image data to be appended to the print job includes data of a language such as a page description language which describes an image to be rendered for each page or for each band. Such data will be referred to as PDL data hereinafter.

An interpreter 108 converts the PDL data received by the communication I/F 118 into an intermediate language format called a display list.

A raster image processor (RIP) 107 performs rendering based on the display list to form bitmap data on the image memory 105. Also, the RIP 107 stores flag data indicating the attributes of the rendered bitmap data in the flag memory 106. The RIP 107 generates flag data for respective pixels of the rendered bitmap data with reference to attribute information (information used to identify the attributes of components such as photo, text, graphics, and the like) held in the PDL data for respective print units (components). That is, upon reception of PDL data indicating generation of a text component, the RIP 107 generates text bitmap data, and stores MOJI='1' in the flag memory 106 as flag data of a region (text region) corresponding to a text image. Note that the RIP 107 stores MOJI='0' in the flag memory 106 for regions other than the text region.

The subsequent processing is the same as that for the scanned image, and a description thereof will be omitted.

[Region Segmentation Unit]

The concept and example of region segmentation processing will be described below. Note that an example of a region attribute extraction method will be described below, but the region segmentation processing is not limited to the following method.

The region segmentation processing extracts features of an image and generates signals (flag data) indicating region attributes so as to apply optimal image processing suited to the features of the image. An original image includes various image regions such as a full-color photo region with continuous tone, a black text region, a halftone dot region represented by the printing on a newspaper or the like, and so forth together. When identical image processing is applied to these regions with different features, preferred image quality cannot often be obtained as the processing result.

Hence, the attributes of image data included in an original image are detected using a color image signal output from the input image processor 102 to generate flag data used to identify these attributes.

Figure 2:
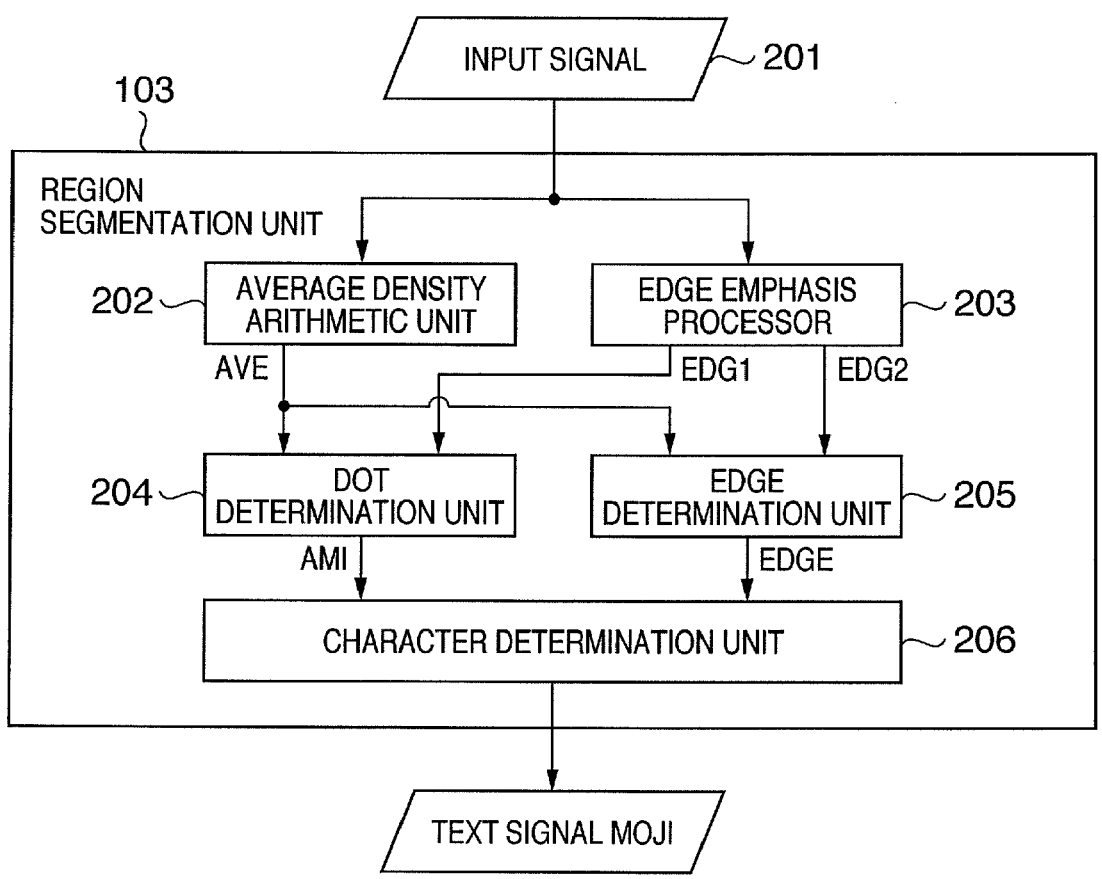
FIG. 2 is a block diagram showing the arrangement for detecting pixels with a text attribute of a region segmentation unit.

FIG. 2 is a block diagram showing the arrangement for detecting pixels with a text attribute of the region segmentation unit 103.

An input signal (color image signal) 201 is input to an average density arithmetic unit 202 and edge emphasis processor 203. The average density arithmetic unit 202 outputs an average value AVE of an area of M×N pixels (M and N are natural numbers) including a pixel of interest as the center. On the other hand, the edge emphasis processor 203 applies edge emphasis processing to the pixel of interest with reference to a surrounding area (e.g., an M×N pixel area) of the pixel of interest to output two types of edge emphasis signals EDG1 and EDG2 having different magnitudes. These signals are input to a dot determination unit 204 and edge determination unit 205.

Figure 3:
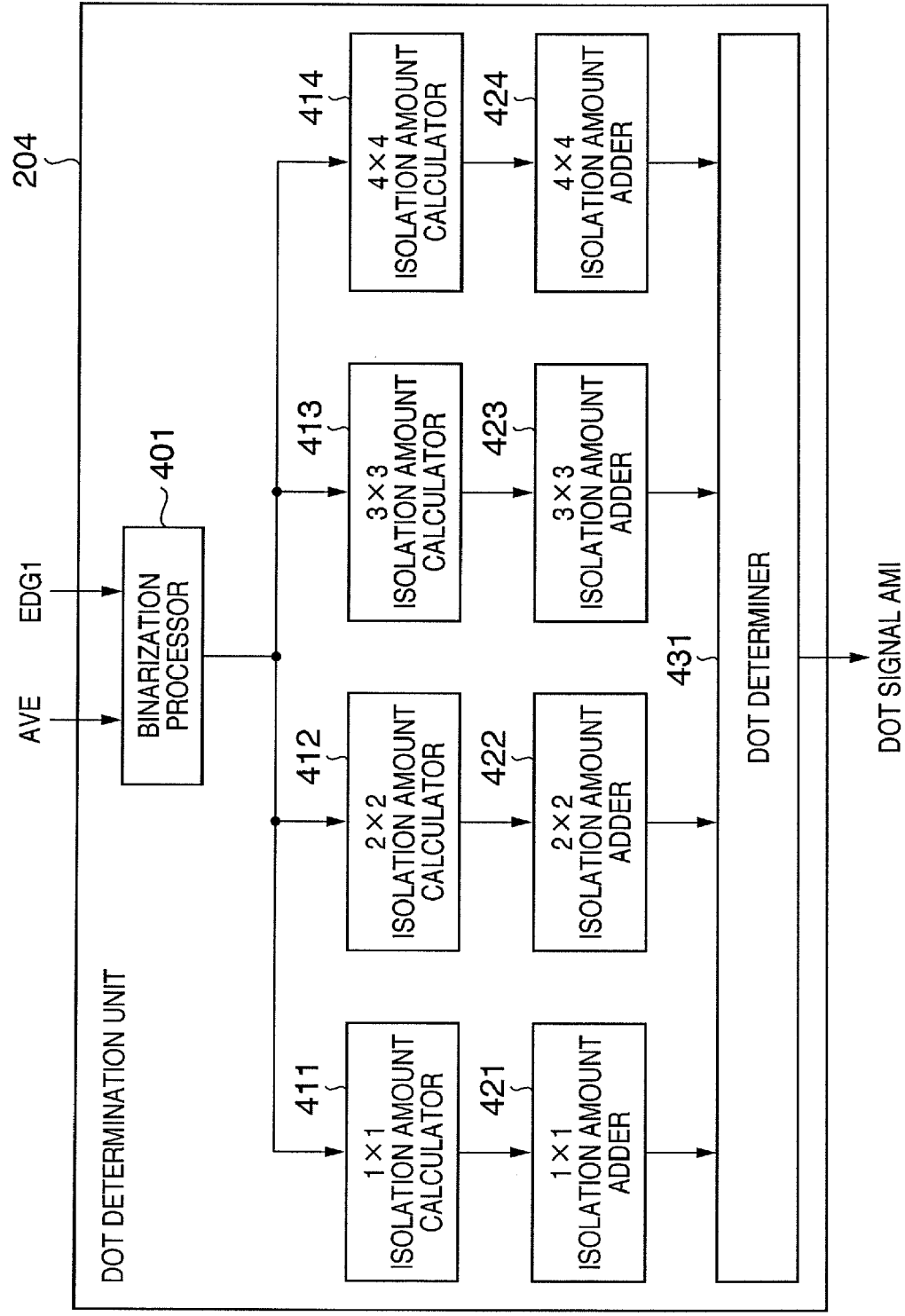
FIG. 3 is a block diagram showing the arrangement of a dot determination unit which receives an average value AVE and edge emphasis signal EDG1.

FIG. 3 is a block diagram showing the arrangement of the dot determination unit 204 which receives the average value AVE and edge emphasis signal EDG1.

A binarization processor 401 generates a binary signal based on a comparison result between the average value AVE and the product obtained by multiplying the edge emphasis signal EDG1 by a given coefficient A (real number) as follows:

If $A \times EDG1 < AVE$, binary signal='1'

If $A \times EDG1 \geq AVE$, binary signal='0'  (1)

Binary signals obtained for respective pixels by the binarization processor 401 are input to a 1×1 isolation amount calculator 411, 2×2 isolation amount calculator 412, 3×3 isolation amount calculator 413, and 4×4 isolation amount calculator 414. The isolation amount calculators 411 to 414 determine the degree of isolation of the pixel of interest using the binarization processing result.

For example, the 1×1 isolation amount calculator 411 calculates an isolation amount with reference to binary signals of a 3×3 pixel area having the pixel of interest as the central position. When the values of the binary signals change like '0', '1', and '0' in the vertical, horizontal, or oblique direction, the calculator 411 sets the isolation amount in that direction to '1'. Then, the calculator 411 outputs a total of the isolation amounts in four directions, i.e., vertical and horizontal directions (one each direction) and oblique directions (two directions) as the isolation amount of the pixel of interest. Therefore, a pixel with a high degree of isolation has an isolation amount="4", and a pixel which is not isolated has an isolation amount="0". Note that the isolation amount has a feature in that it becomes relatively large for a case in which a dot is formed by one pixel, i.e., for a dot pixel in a low-density area or a dot with a high LPI (lines per inch).

Likewise, the 2×2 isolation amount calculator 412, the 3×3 isolation amount calculator 413, and the 4×4 isolation amount calculator 414 output isolation amounts of the pixel of interest by performing a comparison with predetermined binary pixel patterns.

A 1×1 isolation amount adder 421 to 4×4 isolation amount adder 424 respectively add the isolation amounts respectively calculated by the 1×1 isolation amount calculator 411 to the 4×4 isolation amount calculator 414 for a predetermined area. For example, the 1×1 isolation amount adder 421 adds the isolation amounts for a 9×9 pixel area.

A dot determiner 431 performs threshold processing of each of the sum values calculated by the 1×1 isolation amount adder 421 to the 4×4 isolation amount adder 424. The dot determiner 431 outputs a dot signal AMI via processes such as majority decision, logical operations, and the like based on the results of the threshold processing. Note that the dot determiner 431 outputs a dot signal AMI='1' when it determines that the pixel of interest forms a halftone dot region.

Figure 4:
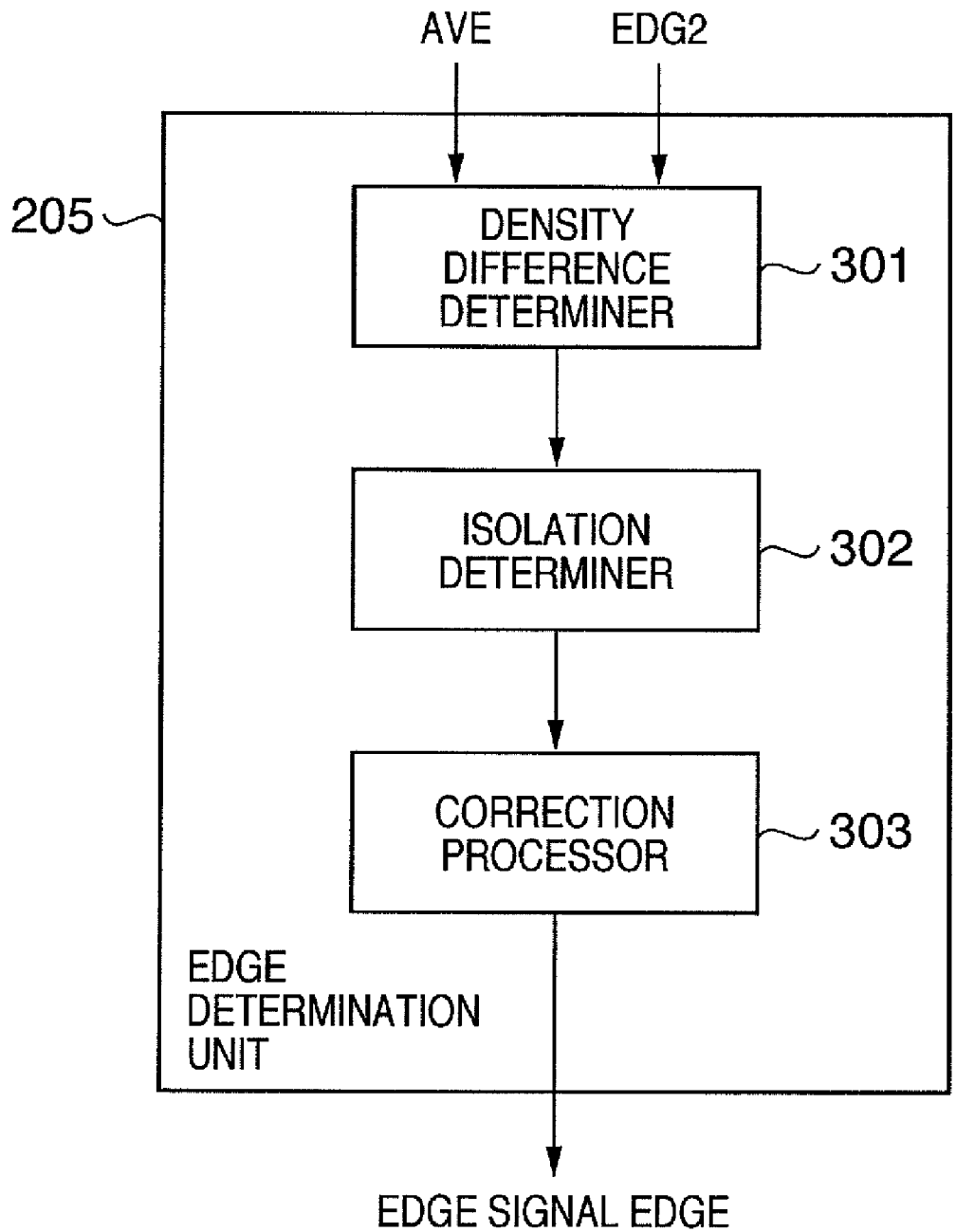
FIG. 4 is a block diagram showing the arrangement of an edge determination unit which receives an average value AVE and edge emphasis signal EDG2.

FIG. 4 is a block diagram showing an example of the arrangement of the edge determination unit 205 which receives the average value AVE and edge emphasis signal EDG2.

A density difference determiner 301 generates a density difference signal based on a comparison result between the product obtained by multiplying the edge emphasis signal EDG2 by a given coefficient B (real number) and the average value AVE as follows.

If $C < AVE - B \times EDG2 < D$, density difference signal='1'

Otherwise, density difference signal='0'  (2)

where C and D are real numbers or integers.

That is, the density difference determiner 301 outputs a density difference signal according to the difference between the value of the edge emphasis signal EDG2 and the values of its surrounding area (average value AVE).

An isolation determiner 302 receives the density difference signal and removes an isolated point. For example, when there are no density difference signals with a value '1' at boundary pixel positions with reference to the density difference signals in a 7×7 pixel area, the isolation determiner 302 forcibly sets the values of the density difference signals in an inner 5×5 pixel area to '0', thus removing an isolated point. Note that the density difference signal after isolated point removal output from the isolation determiner 302 is called an "isolation determination signal".

A correction processor 303 receives isolation determination signals, and outputs an edge signal EDGE obtained by correcting a discontinuous part of the isolation determination signals. For example, when the values of isolation determination signals of eight pixels including the pixel of interest at the center of an area are '1' and the value of the isolation determination signal of the pixel of interest is '0' with reference to the isolation determination signals in a 3×3 pixel area, the processor 303 corrects the value of the isolation determination signal of the interest pixel to '1'. With this processing, the processor 303 repairs a missing part where the isolation determination signals are lacking in an edge area of a line drawing or character, and generates smooth edge signals EDGE with increased continuity of the edge area of the line drawing or character. Note that the correction processor 303 outputs an edge signal EDGE='1' for an edge area.

A character determination unit 206 shown in FIG. 2 receives the dot signal AMI output from the dot determination unit 204 and the edge signal EDGE output from the edge determination unit 205, and outputs a text signal MOJI indicating a pixel with AMI='0' and EDGE='1'.

Figure 5:
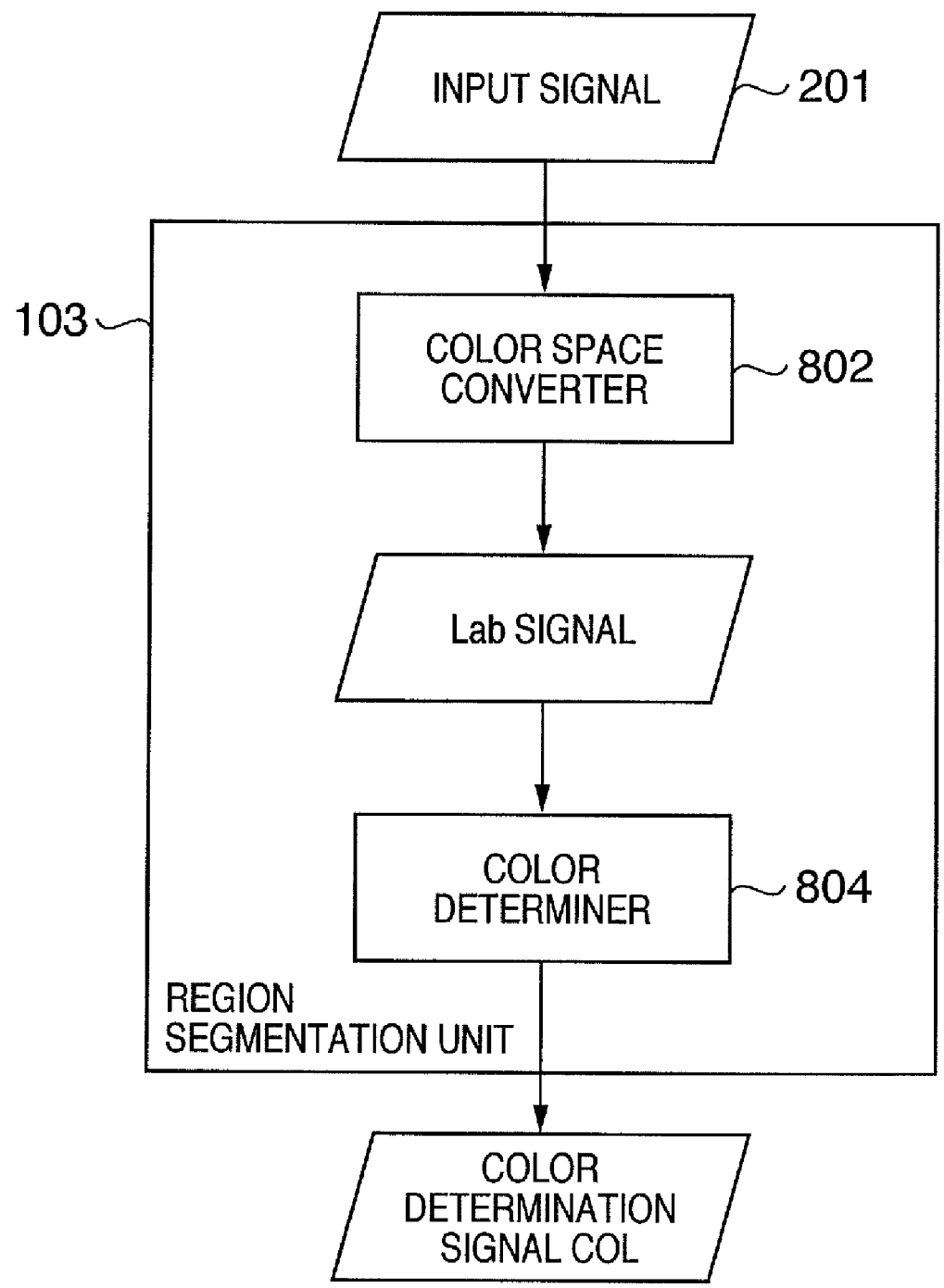
FIG. 5 is a block diagram showing the arrangement for detecting pixels of a color attribute of the region segmentation unit.

FIG. 5 is a block diagram showing the arrangement for detecting pixels with a color attribute of the region segmentation unit 103.

An input signal (color image signal) 201 is input to a color space converter 802, and is converted into, e.g., an Lab signal. A color determiner 804 receives the Lab signal and outputs a color determination signal COL.

Whether or not a given pixel of image data is a color pixel can be easily determined by mapping the chromaticity levels of pixels on a color space. This determination processing will be described below taking an Lab color space as an example.

The Lab color space is the one which was proposed by Commission Internationale de l'Eclairage (CIE) in 1976 as a uniform color space. L represents lightness (brightness), a represents chromaticity from red to green, and b represents chromaticity from blue to yellow, which can be used to form an Lan color space. Since the Lab color space is configured so that a change in the three-dimensional color space is proportional to the impression of a change in color of the visual sense influenced by that change, accurate color determination can be attained.

Equations (3) express an example of conversion from an RGB signal into an Lab signal. Normally, after XYZ tristimulus values are temporarily calculated from RGB signal values, Lab signal values are calculated from the XYZ tristimulus values. Note that the present invention is not limited to coefficients in equations (3) since they are device-dependent.

$$X = 0.412391 \times R + 0.357584 \times G + 0.180481 \times B$$

$$Y = 0.212639 \times R + 0.715169 \times G + 0.072192 \times B$$

$$Z = 0.019331 \times R + 0.119195 \times G + 0.950532 \times B$$

$$L^* = 116(Y/Y0)^{1/3} - 16$$

$$a^* = 500\{(X/X0)^{1/3} - (Y/Y0)^{1/3}\}$$

$$b^* = 200\{(Y/Y0)^{1/3} - (Z/Z0)^{1/3}\} \quad (3)$$

where X0, Y0, and Z0 are tristimulus values of standard light.

Figure 6:
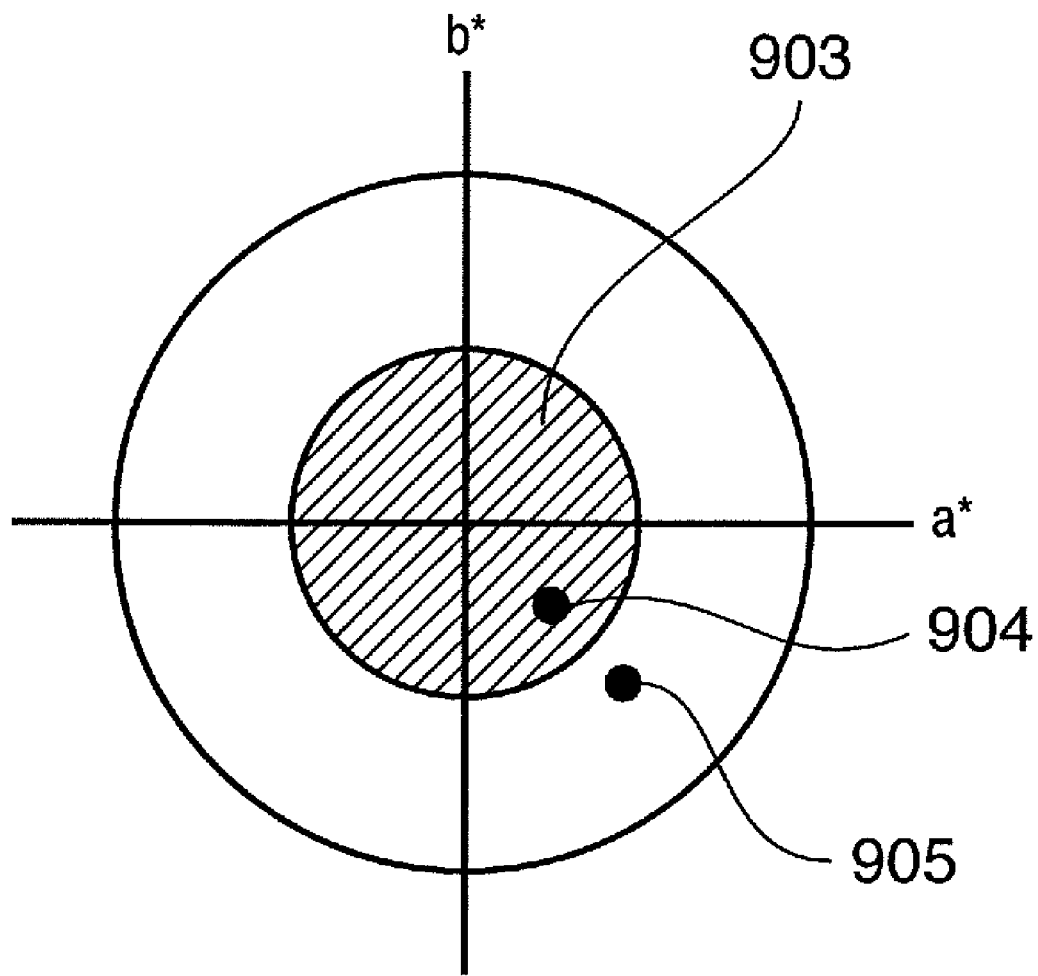
FIG. 6 shows an a*b* plane.

By mapping ab values of respective pixels calculated using equations (3) on an orthogonal coordinate system, whether a given pixel is chromatic or achromatic color is determined. FIG. 6 shows an a*b* plane. Upon making a chromatic/achromatic color determination with reference to, e.g., saturation, the intersection between a* and b* axes, i.e., the origin is a point where the color component is zero, it can be noted that saturation becomes higher with increasing distance from the origin (with increasing a* value and/or b* value). Therefore, a chromatic/achromatic color determination can be made by setting a threshold indicating the distance from the origin. That is, assuming that a hatched area 903 shown in FIG. 6 is an achromatic color area, if the ab values of a given pixel are located at a point 904 inside the hatched area 903, it is determined that the pixel is achromatic color. On the other hand, if the ab values are located at a point 905 outside the hatched area 903, it is determined that the pixel is chromatic color.

With the above method, whether the pixel of interest is a chromatic or achromatic color, in other words, whether or not the pixel of interest is a pixel with a color attribute can be determined.

Note that the chromaticity calculation has been explained using Lab, but the present invention is not limited to this. In order to reduce the computation volume, simple conversion formulas may be used instead.

[Output Image Processor]

Figure 8:
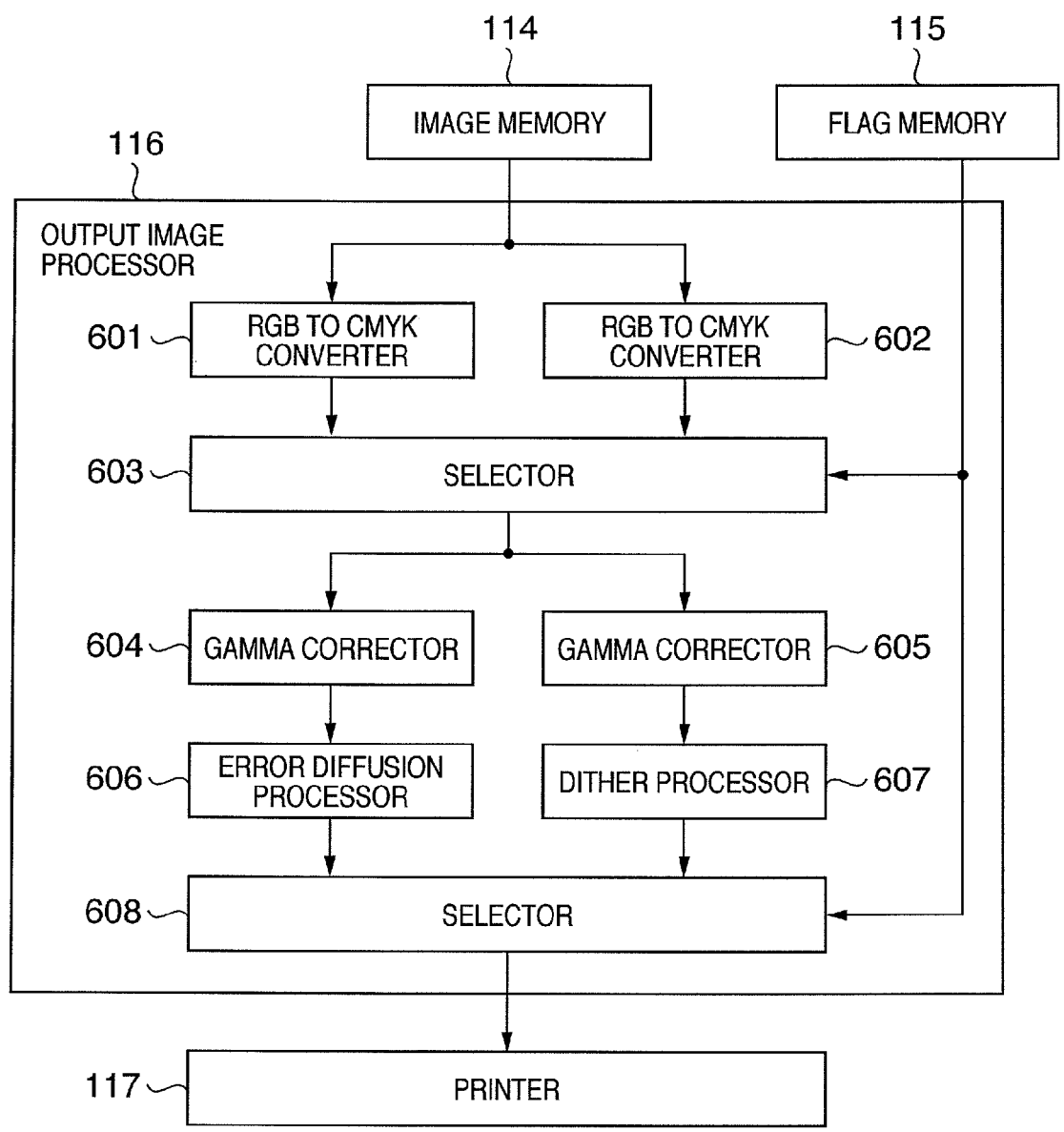
FIG. 8 is a block diagram showing the arrangement of an output image processor.

FIG. 8 is a block diagram showing the arrangement of the output image processor 116.

RGB to CMYK converters 601 and 602 receive RGB color image data from the image memory 114 and independently convert the received data into CMYK data. A selector 603 selects the output from the RGB to CMYK converter 601 or 602 for each pixel in accordance with the flag data input from the flag memory 115.

The RGB to CMYK converter 601 is set with conversion coefficients (or a conversion table) for a text region, and the RGB to CMYK converter 602 is set with conversion coefficients (or a conversion table) for regions other than a text region. Therefore, in case of a black character pixel (a text region (MOJI='1') and a non-color pixel (COL='0')), the selector 603 selects conversion coefficients that reproduce the pixel by only black toner (or black ink). In other words, when image data is achromatic color, a CMYK image signal to which coefficients (or a conversion table) for setting C, M, and Y=0 are applied is selected. On the other hand, in case of a region other than the text region (MOJI='0'), the selector 603 selects a CMYK image signal to which conversion coefficients (or conversion table) used to generate a signal, which has C, M, and Y≠0 even for an achromatic color (COL='1'), and to reproduce velvety black are applied. In this way, the method of generating a CMYK image signal can be changed between the text region and another region such as a photo region or the like, thus improving the image quality of an output image.

Next, the output from the selector 603 is input to a processing system including a gamma corrector 604 and error diffusion processor 606, and to a processing system including a gamma corrector 605 and a dither processor 607. A selector 608 selects for respective pixels the output from the error diffusion processor 606 or that from the dither processor 607 in accordance with the flag data input from the flag memory 115.

Therefore, the selector 608 selects the output from the error diffusion processor 606 in preference to the sharpness of an output image for the text region and graph region, and selects that from the dither processor 607 with the emphasis on the tone characteristic for the photo region and halftone dot region, thus improving the image quality of the output image.

[Forgery Determination Processor]

A forgery determination processor 120 executes forgery determination processing required to prevent originals such as banknotes and the like whose copying is inhibited (to be referred to as "specific originals" hereinafter) from being copied. To attain this processing, there are some methods, and a representative one is pattern matching. Features such as the shape, colors, and the like of a specific original, or a feature intentionally embedded in an original image are extracted to calculate a similarity with information stored in advance, and whether or not the original of interest is a specific original is determined based on the similarity.

Figure 9:
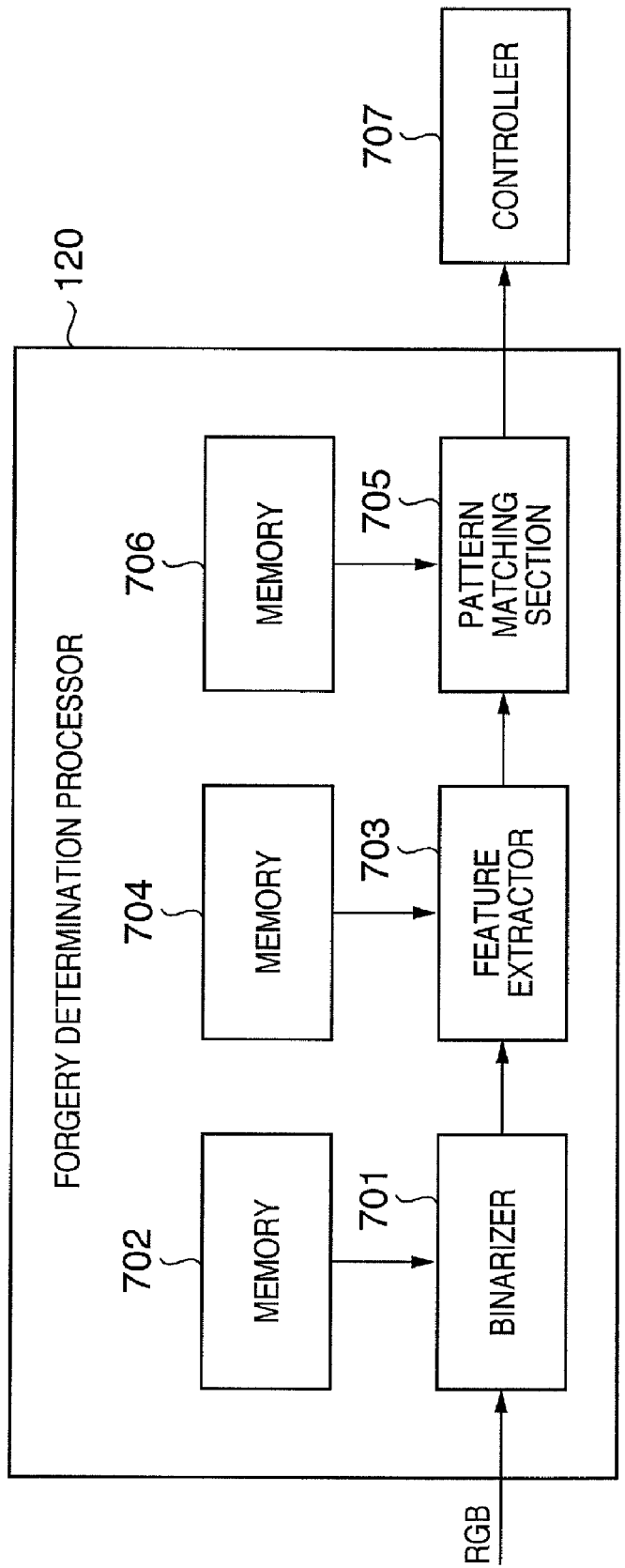
FIG. 9 is a block diagram showing the arrangement of a forgery determination processor.

FIG. 9 is a block diagram showing the arrangement of the forgery determination processor 120.

The forgery determination processor 120 receives a scanned image from the input image processor 102 or bitmap data from the RIP 107 as an RGB image signal used in the determination. A binarizer 701 binarizes an input RGB image signal into a binary signal using a threshold stored in a memory 702. Note that the binarization threshold value is variable.

A feature extractor 703 extracts a portion similar to feature information stored in a memory 704 from the binary image. The memory 704 stores a shape, colors, or a specific mark which represent features of a specific original, a feature intentionally embedded in an original image, and so forth.

When an image extracted by the feature extractor 703 matches a pattern stored in a memory 706, a pattern matching section 705 informs a controller 707 of that result. Upon reception of a message indicating that the pattern is matched, the controller 707 blocks copying or printing of the specific original by, e.g., deleting the scanned image or received image stored in the image memory 105 or painting the pattern-matched image portion in solid black.

Note that the controller 707 comprises a one-chip CPU or the like, which controls the aforementioned respective units to control the operation of the entire apparatus. An example of the forgery determination processing to be executed in a copying machine or the like has been explained. However, the present invention is not limited to such specific processing.

[Detection of Halftone Dot Region]

The aforementioned image processing system extracts features of an image using the region segmentation processing, and applies optimal image processing according to image regions included in the image. For example, the system extracts a photo region and text region in the image, applies photo image processing that places greater emphasis on color tone or tone balance to the photo region, and applies text image processing that places greater emphasis on the sharpness to the text region, thus improving the image quality of an output image. Also, the system detects color components of the image, and prints achromatic characters and the like in black, thus improving the image quality.

However, when a halftone dot region is detected using the concept of an isolation amount, the detection precision of a halftone dot region of a low-density part does not suffice. When a halftone dot region includes a character edge or images of dust or contamination, the isolation amount decreases, and the detection precision of the halftone dot region consequently drops.

Figure 10A:
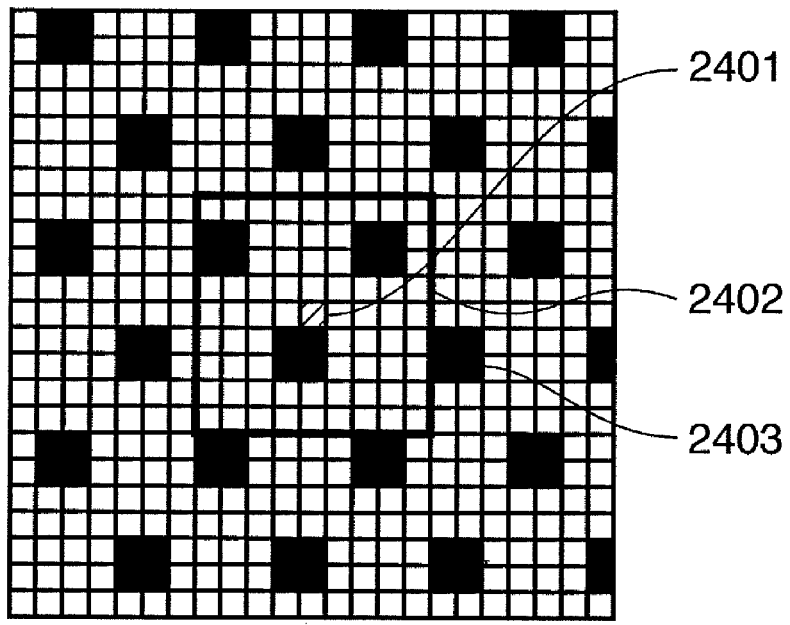
FIGS. 10A and 10B are views for explaining detection of a halftone dot region.
Figure 10B:
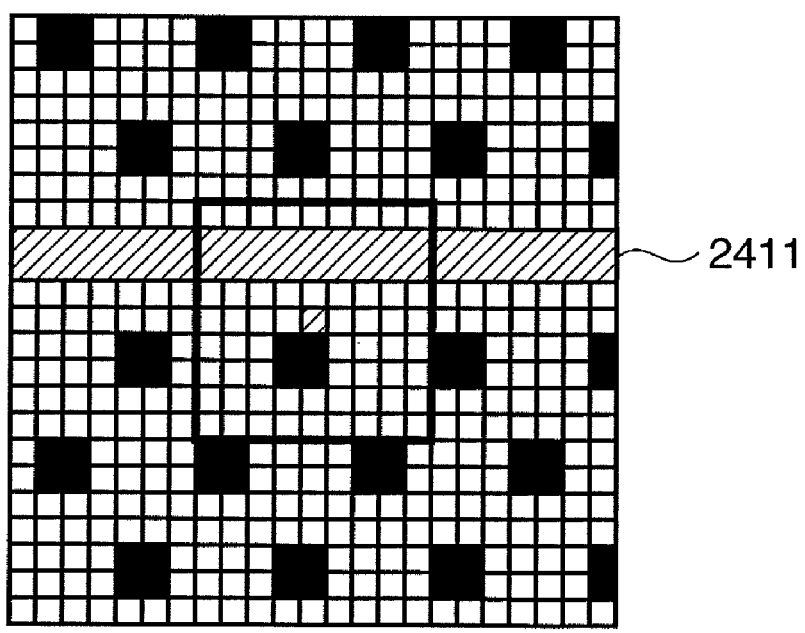

FIGS. 10A and 10B are views for explaining detection. FIG. 10A shows an example of a normal halftone dot region, and FIG. 10B shows an example of a halftone dot region including a character edge. In FIGS. 10A and 10B, each cell indicates one pixel. For the sake of simplicity, an isolation amount is expressed by 1 bit: the isolation amount of each black pixel shown in FIGS. 10A and 10B is '1', and that of each white pixel therein is '0'.

For example, assuming that isolation amounts are added with a 9×9 pixel area 2402, if the isolation amount within the area 2402 is more than 5% (five pixels or more), it is specified that a pixel of interest falls within a halftone dot region; if the isolation amount is equal to or smaller than 5% (4 pixels or less), it is specified that a pixel of interest does not fall within a halftone dot region.

In the normal halftone dot region shown in FIG. 10A, the sum of the isolation amounts within the 9×9 pixel area 2402 having a pixel of interest 2401 as the center is 12 (pixels), and it is determined based on the above specification that the pixel of interest falls within the halftone dot region. On the other hand, when a character edge 2411 exists, as shown in FIG. 10B, if the isolation amounts are added under the same condition, the isolation amounts decrease due to the influence of the character edge 2411. As a result, the sum is 4 (pixels), and it is determined that the pixel of interest does not fall within the halftone dot region.

In order to solve this problem, the following methods may be adopted: (1) a threshold for dot determination is set in a direction to make it easy to extract dots; (2) the latitude of detection is broadened by expanding an area in which the isolation amounts are integrated; and so forth. However, in case of (1), the detection precision of a halftone dot region can improve, but detection errors of an area, which is not a halftone dot region, as a halftone dot region increase. In case of (2), if the reference area is expanded, a surrounding portion of a halftone dot region which should not be determined as a halftone dot region may be undesirably determined as a halftone dot region.

Figure 11A:
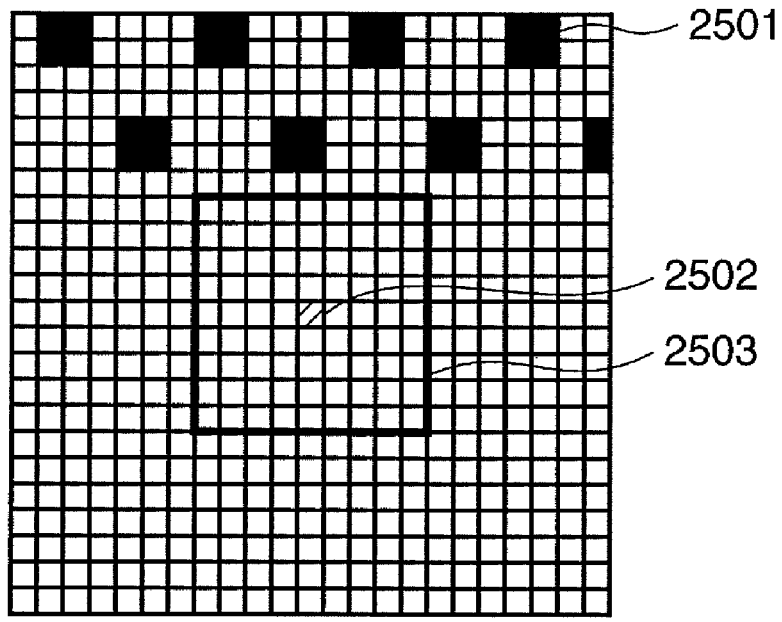
FIGS. 11A and 11B are views for explaining a problem posed when an area for integrating isolation amounts is enlarged.
Figure 11B:
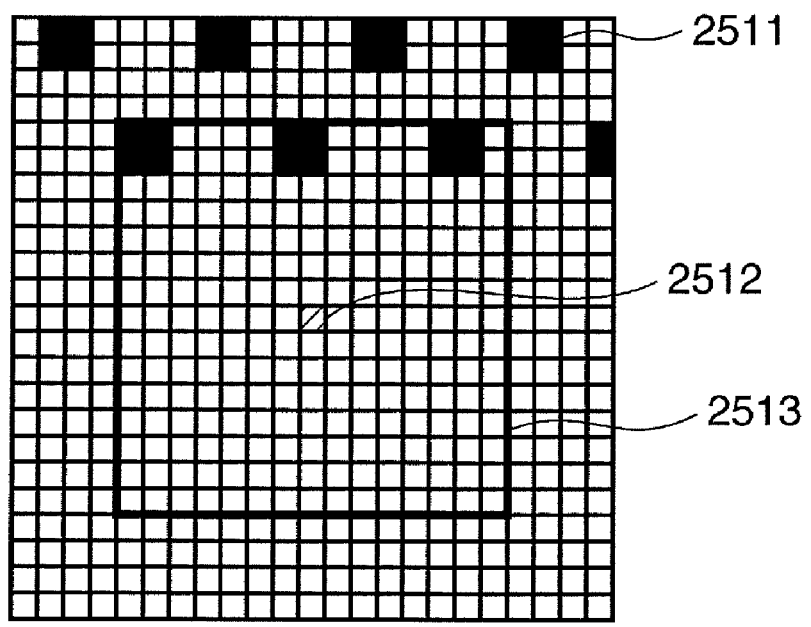

FIGS. 11A and 11B are views for explaining problems posed when an area in which the isolation amounts are integrated is expanded. FIG. 11A shows a state before the area expansion, and FIG. 11B shows a state after the area expansion.

Since the sum of isolation amounts in a 9×9 pixel area 2503 before the area expansion shown in FIG. 11A is zero, it is determined that a pixel of interest 2502 does not fall within a halftone dot region. On the other hand, since the sum of isolation amounts in a 15×15 pixel area 2513 after area expansion shown in FIG. 11B is 12 (pixels), it exceeds 5% (11 pixels), and it is determined that the pixel of interest falls within a halftone dot region.

A detection method of a halftone dot region that can improve the detection precision of a halftone dot region even when the halftone dot region includes a character edge or images of dust or contamination, and can prevent the above negative effects will be described below.

[Region Segmentation Processing]

Figure 12:
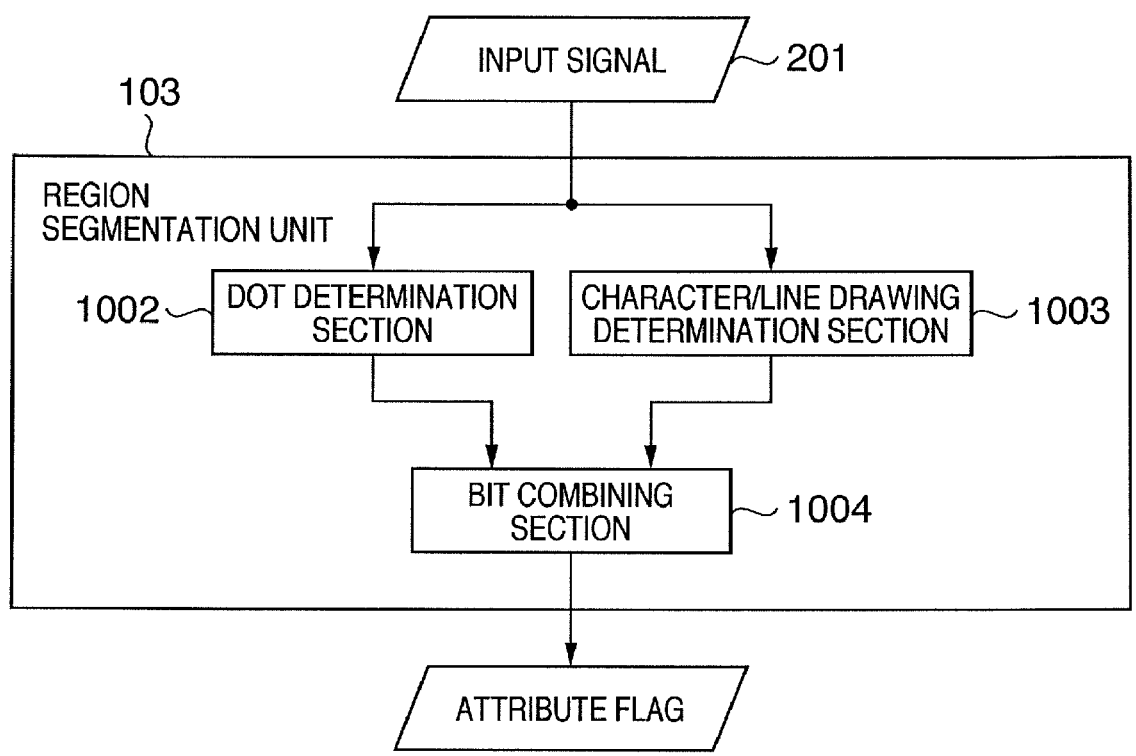
FIG. 12 is a block diagram showing the arrangement of the region segmentation unit which has improved detection precision of a halftone dot region.

FIG. 12 is a block diagram showing the arrangement of the region segmentation unit 103 which improves the detection precision of a halftone dot region.

An input signal 201 is input to a dot determination section 1002 which makes a dot determination, and a character/line drawing determination section 1003 which makes a character/line drawing determination. A bit combining section 1004 generates and outputs an attribute flag obtained by combining the determination results of these units into one signal. Based on this attribute flag, optimal image processing can be applied to image regions included in an image.

Character/Line Drawing Determiner

Figure 13:
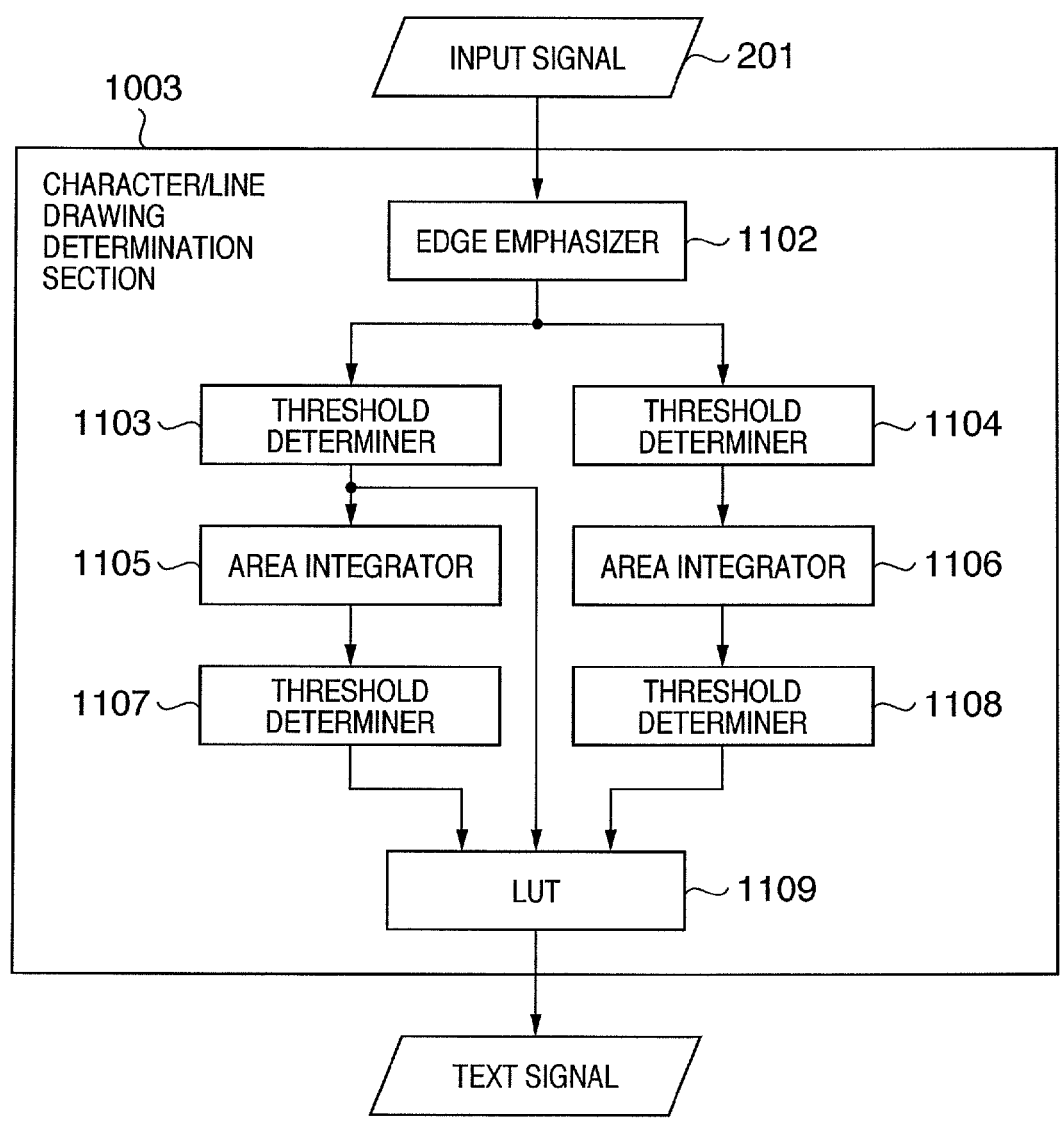
FIG. 13 is a block diagram showing the arrangement of a character/line drawing determination section.

FIG. 13 is a block diagram showing the arrangement of the character/line drawing determiner 1003.

The input signal 201 is input to an edge emphasizer 1102 which performs edge emphasis processing. The edge emphasizer 1102 executes digital filter processing for emphasizing and extracting desired frequency components of image data.

Note that as an example of a representative filter, a secondary differential filter such as a Laplacian filter or the like may be used.

An edge emphasis signal output from the edge emphasizer 1102 is input to threshold determiners 1103 and 1104. Since the signal which has undergone the secondary differential filter processing by the edge emphasizer 1102 has a positive or negative signal value, a positive threshold value is set in the threshold determiner 1103, and a negative threshold value is set in the threshold determiner 1104.

For example, a change in signal value of an input signal 201, which is obtained by scanning an edge part of a black character 1502 on a white background 1503 shown in FIG. 14A along an arrow 1510, is as shown in FIG. 14B. That is, a part in front of an edge boundary 1501 (interior of the character 1502) is dark and assumes a low signal value. However, when the edge boundary 1501 is exceeded, the background 1503 is bright, and the signal value rises abruptly. When the input signal 201 which exhibits such change undergoes secondary differential filter processing, its signal value assumes a positive value before the edge boundary 1501, and assumes a negative value after the edge boundary 1501, as shown in FIG. 14C. That is, the threshold determiner 1103 outputs an inner edge signal='1' indicating the inner side of the character edge when the edge emphasis signal exceeds the positive threshold. On the other hand, the threshold determination unit 1104 outputs an outer edge signal='1' indicating the outer side of the character edge when the edge emphasis signal becomes lower than the negative threshold.

Note that FIGS. 14A to 14C show a scan in only one direction. However, in practice, at least a scan in a direction perpendicular to that shown in FIGS. 14A to 14C is also made, and the OR of the edge detection results in at least the two directions is adopted as an edge signal.

The inner edge signal output from the threshold determiner 1103 is input to an area integrator 1105. The outer edge signal output from the threshold determiner 1104 is input to an area integrator 1106. Each of the area integrator 1105 and 1106 counts determination signals='1' of, e.g., an interest pixel and its surrounding 3×3 pixel area.

Threshold determiners 1107 and 1108 respectively compare the count values output from the area integrators 1105 and 1106 with a threshold, and output determination results. For example, when "2" is set as a threshold, the threshold determiner 1107 outputs a determination signal='1' when the input count value is 2 or more, i.e., when the 3×3 pixel area includes two or more pixels which are determined as inner edge pixels. Likewise, the threshold determiner 1108 outputs a determination signal='1' when the 3×3 pixel area includes two or more pixels which are determined as outer edge pixels.

Figure 15A:
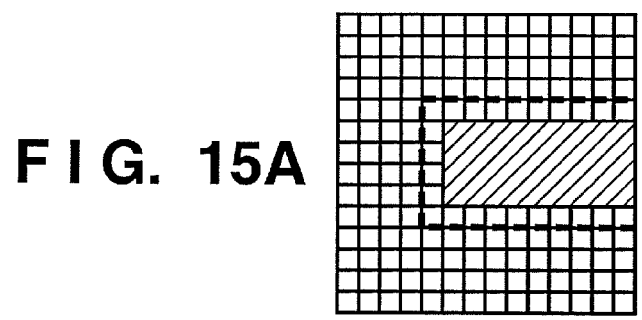
FIGS. 15A to 15F are views for explaining respective determinations of the character/line drawing determination section.

FIGS. 15A to 15F are views for explaining respective determinations in the character/line drawing determination section 1003. FIG. 15A shows the input signal 201, i.e., a state wherein a black character edge exists on a white background.

Figure 15B:
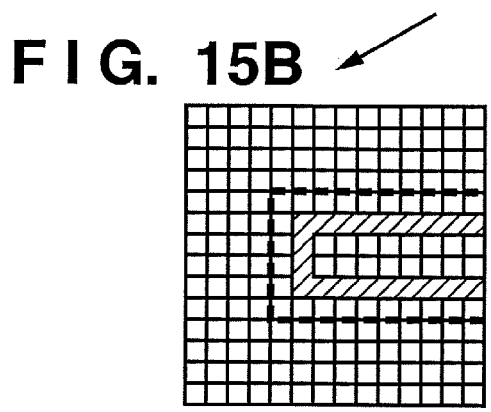

When the threshold determiner 1103 determines a signal obtained by applying edge emphasis to the input signal 201, an inner edge signal (hatched portion='1') shown in FIG. 15B is obtained. When such inner edge signal undergoes area-integration (counting) within a 3×3 pixel area, and the count value is determined by the threshold determiner 1107, a determination signal shown in FIG. 15C is obtained. That is, the inner edge signal is expanded (to be referred to as an "inner edge expansion signal" hereinafter).

Figure 15D:
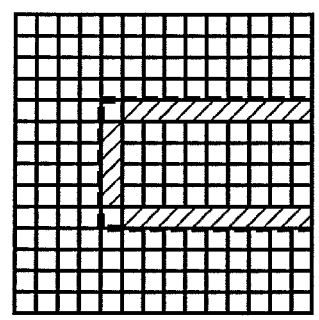
Figure 15C:
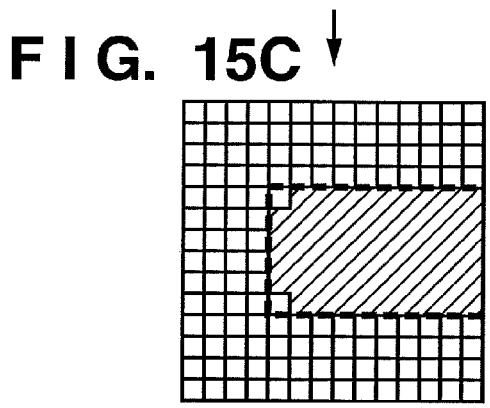
Figure 15E:
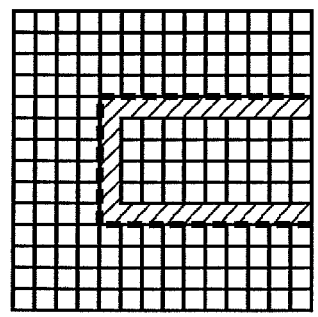

On the other hand, when the threshold determiner 1104 determines a signal obtained by applying edge emphasis to the input signal 201, an outer edge signal shown in FIG. 15D is obtained. When such outer edge signal undergoes area-integration (counting) within a 3×3 pixel area, and the count value is determined by the threshold determiner 1108, a determination signal shown in FIG. 15E is obtained. That is, the an outer edge signal is expanded (to be referred to as an "outer edge expansion signal" hereinafter).

A lookup table (LUT) 1109 receives the determination signals from the threshold determination units 1103, 1107, and 1108, and outputs a text signal according to the following logical operations:

If inner edge determination signal='1', text signal='1';

if inner edge determination signal='1', and inner edge expansion signal='1' and outer edge expansion signal='1', text signal='1'; or otherwise, text signal='0'.

FIG. 16 shows the table configuration of the LUT 1109 which corresponds to the above logical operations.

Figure 15F:
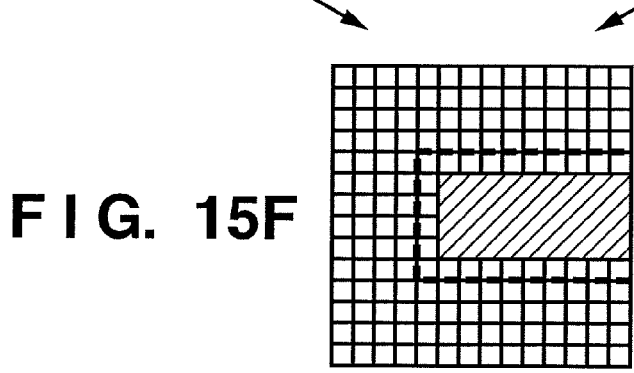

That is, the LUT 1109 outputs a text signal, as shown in FIG. 15F according to the results of an inner edge determination, an area integration determination of the inner edge determination, and an area integration determination of an outer edge determination.

Dot Determination Unit

Figure 17:
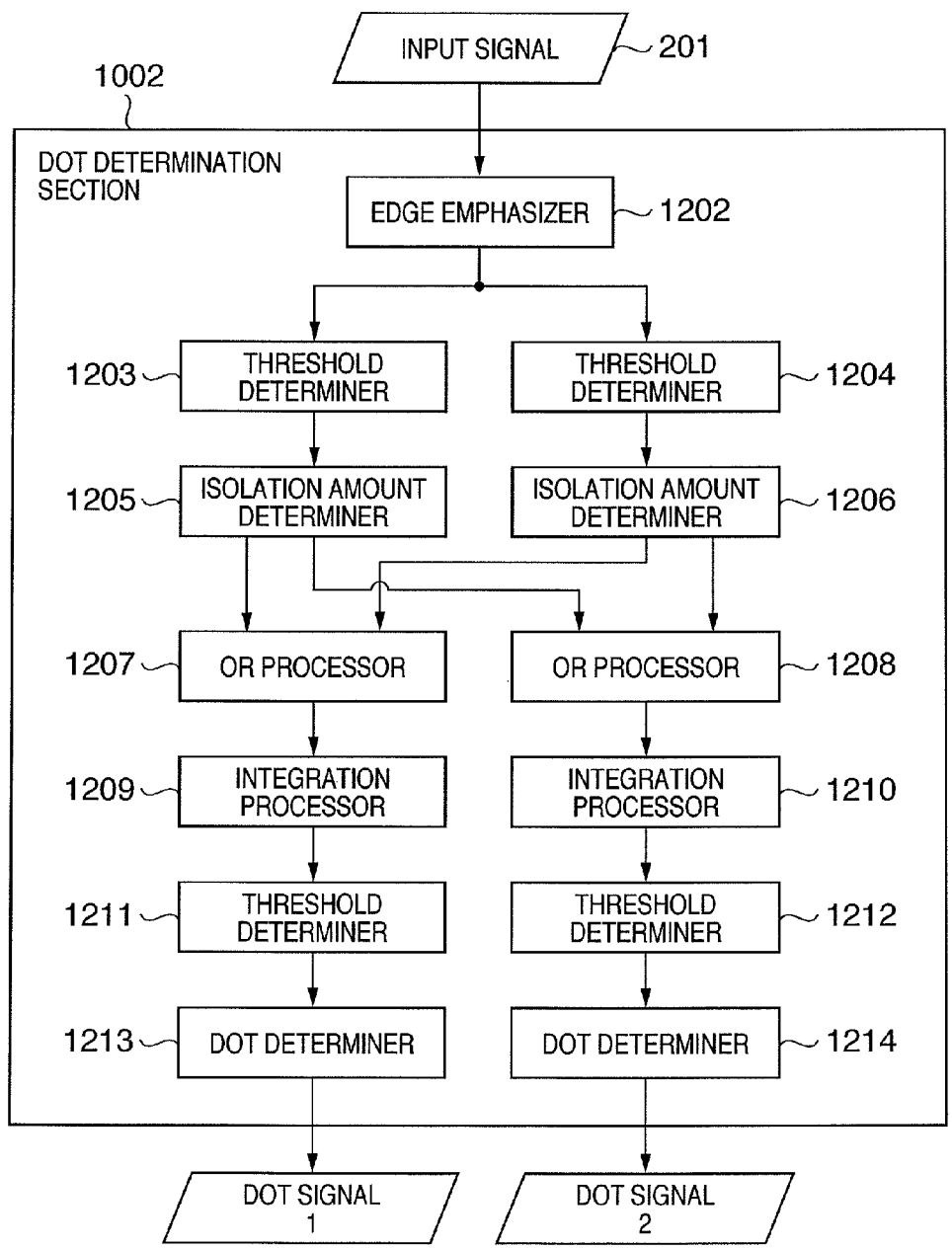
FIG. 17 is a block diagram showing the arrangement of the dot determination section.

FIG. 17 is a block diagram showing the arrangement of the dot determination section 1002.

An input signal 201 is input to an edge emphasizer 1202 which performs the same edge emphasis processing as that in the edge emphasizer 1102.

An edge emphasis signal output from the edge emphasizer 1202 is input to threshold determiners 1203 and 1204. Since the signal which has undergone the secondary differential filter processing by the edge emphasizer 1202 has a positive or negative signal value, a positive threshold value is set in the threshold determiner 1203, and a negative threshold value is set in the threshold determiner 1204.

Figure 18A:
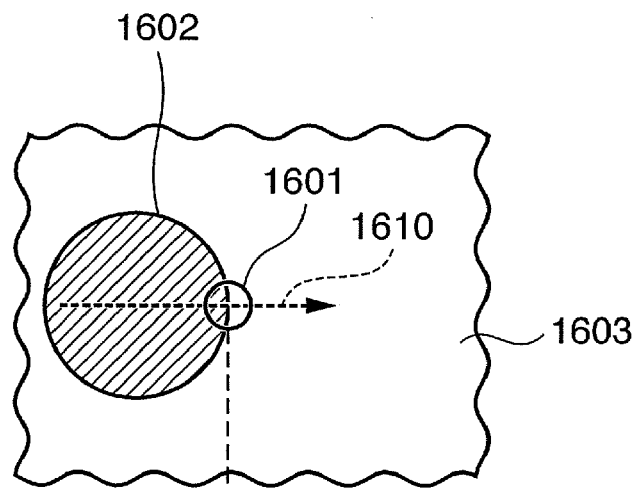
FIGS. 18A to 18C are views for explaining processing of the edge emphasizer.
Figure 18B:
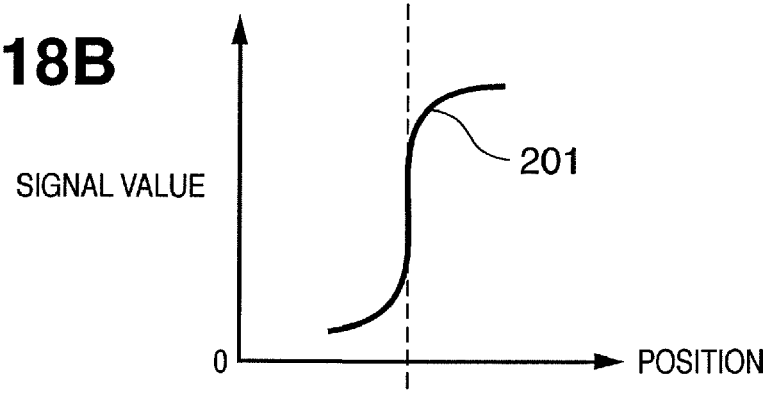
Figure 18C:
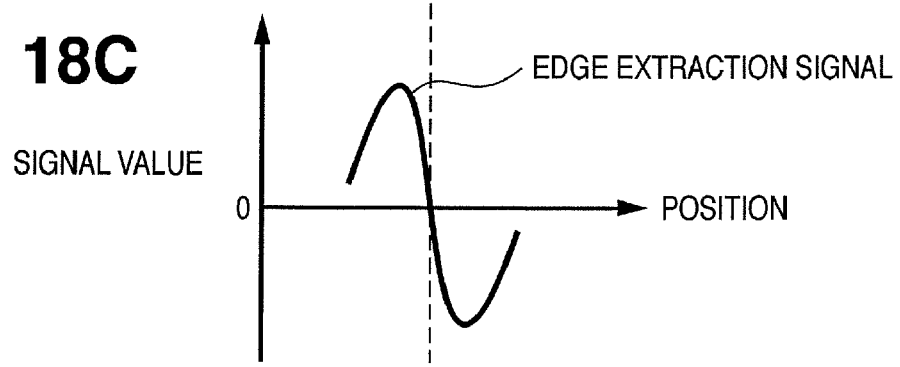

For example, a change in signal value of an input signal 201, which is obtained by scanning an edge part of a dot 1602 on a white background 1603 shown in FIG. 18A along an arrow 1610, is as shown in FIG. 18B. That is, a part in front of an edge boundary 1601 (interior of the dot 1602) is dark and assumes a low signal value. However, when the edge boundary 1601 is exceeded, the background 1603 is bright, and the signal value rises abruptly. When the input signal 201 which exhibits such change undergoes secondary differential filter processing, its signal value assumes a positive value before the edge boundary 1601, and assumes a negative value after the edge boundary 1601, as shown in FIG. 18C. That is, the threshold determiner 1203 outputs an inner edge signal='1' indicating the inner side of the character edge when the edge emphasis signal exceeds the positive threshold. On the other hand, the threshold determination unit 1204 outputs an outer edge signal='1' indicating the outer side of the character edge when the edge emphasis signal becomes lower than the negative threshold.

Note that FIGS. 18A to 18C show a scan in only one direction. However, in practice, at least a scan in a direction perpendicular to that shown in FIGS. 18A to 18C is also made, and the OR of the edge detection results in at least the two directions is adopted as an edge signal.

The inner edge signal output from the threshold determiner 1203 is input to an isolation amount determiner 1205. The outer edge signal output from the threshold determiner 1204 is input to an isolation amount determiner 1206.

The isolation amount determiner 1205 performs pattern matching for the inner edge signal to detect a dot. There are various dot images such as one having a low LPI to one having a high LPI, and the dot size and interval vary depending on the images. In order to detect dots of varied LPIs, pattern matching is done using a plurality of patterns. For a dot image with a low LPI, pattern matching is performed using a large pattern to detect a dot. Also, for a dot image with a high LPI, pattern matching is performed using a small pattern to detect a dot. Since the shape of a dot changes depending on the densities involved, the determination level is adjustable to cope with it.

FIGS. 19A and 19B are views for explaining pattern matching for isolation amount detection, and show an example of pattern matching in a 4×4 pixel area.

FIG. 19A shows inner edge signals in a 4×4 pixel area, and pixels with inner edge signals='1' are four pixels (black pixels) denoted by reference numerals 1702. The remaining pixels are those with inner edge signals='0'. Note that a pixel 1701 with a symbol * is a pixel of interest.

FIG. 19B shows an example of pattern matching of 4×4 pixels. In FIG. 19B, four black pixels 1712 have inner edge signals='1', eight white pixels 1713 have inner edge signals='0', and four hatched pixels 1714 are pixels which may have either values. Based on this pattern, the matching levels of the black pixels 1712 and white pixels 1713 are set to be adjustable to adjust the determination level.

FIGS. 20A to 20D are views for explaining isolation amount determination, and show examples of the determination results of the inner edge signals and the interest pixel 1701 in the 4×4 pixel area.

Figure 20A:
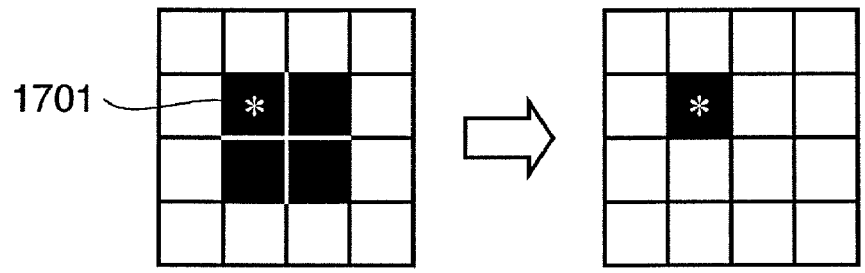
FIGS. 20A to 20D are views for explaining isolation amount determination.
Figure 20B:
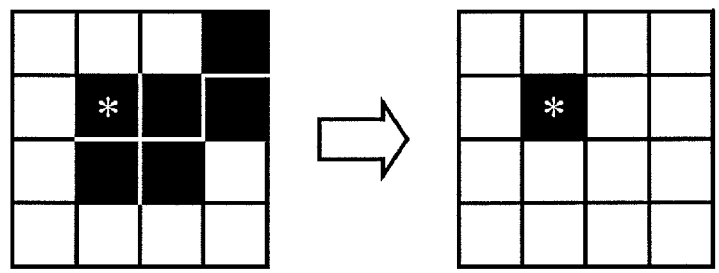
Figure 20C:
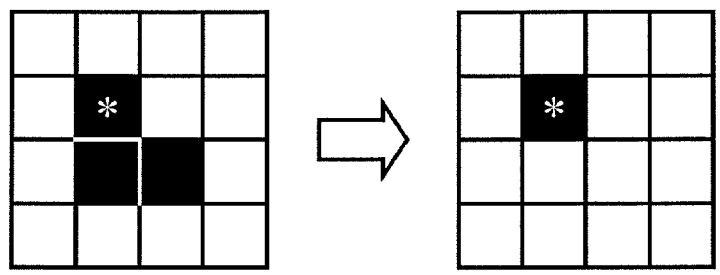

As shown in FIGS. 20A to 20C, an isolation amount determination signal of the interest pixel 1701 assumes '1' under the following conditions.

That is, the number of pixels (those with inner edge signals='1') that match the four black pixels 1712 is three or more, and the number of pixels (those with inner edge signals='0') that match the eight white pixels 1713 is six or more.

Figure 20D:
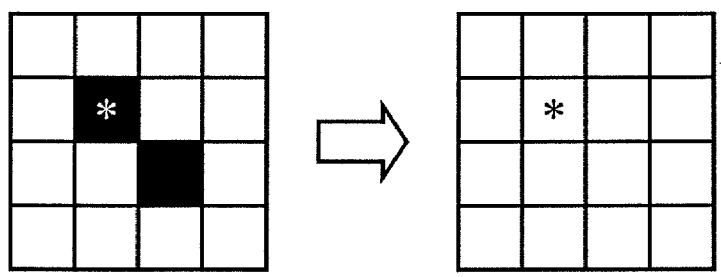

When the above conditions are not satisfied, isolation amount determination signal='0' of the pixel of interest 1701 is determined, as shown in FIG. 20D.

The number of pixels that match the pattern is the matching level, and the determination level is adjusted by adjusting this level.

The isolation amount determiner 1205 performs such pattern matching using a plurality of patterns. Also, the isolation amount determiner 1206 that performs isolation amount determination of outer edge signals performs the same pattern matching as the isolation amount determiner 1205. In this case, the matching patterns and determination levels can be arbitrarily adjusted and set.

OR processors 1207 and 108 receive both the isolation amount determination signals output from the isolation amount determiners 1205 and 1206. The OR processor 1207 calculates the OR of isolation amount determination signals in, e.g., a 3×3 pixel area, and sets a determination signal='1' of the pixel of interest if at least one pixel is '1'.

Figure 21A:
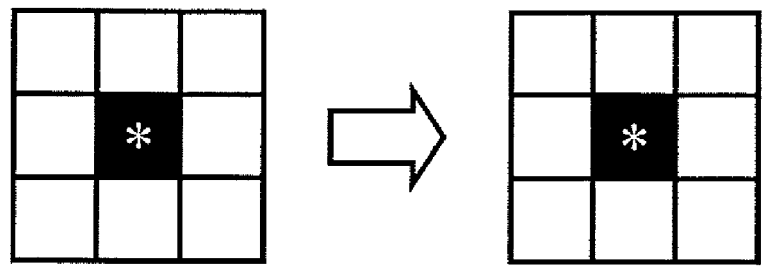
FIGS. 21A to 21C are views for explaining processing of an OR processor.
Figure 21B:
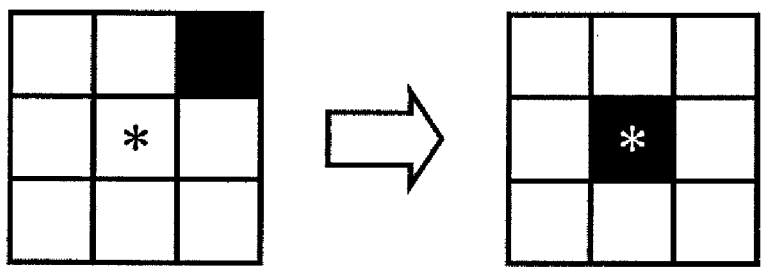
Figure 21C:
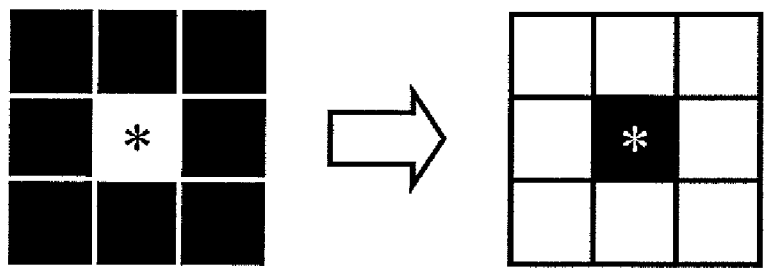

FIGS. 21A to 21C are views for explaining the processing of the OR processors 1207 and 1208.

FIG. 21A shows a case wherein only the isolation amount determination signal of the pixel of interest in the 3×3 pixel area is '1', and a signal (to be referred to as "OR signal" hereinafter) of the pixel of interest after the OR processing becomes '1'. FIG. 21B shows a case wherein the isolation amount determination signal of the pixel of interest is '0' but the region includes a pixel with an isolation amount determination signal='1'. Hence, an OR signal of the pixel of interest after the OR processing becomes '1'. FIG. 21C shows a case wherein only the isolation amount determination signal of the pixel of interest is '0', and those of other pixels are '1'. Hence, an OR signal of the pixel of interest after the OR processing becomes '1'.

The OR signals output from the OR processors 1207 and 1208 become dot signals 1 and 2 via integration processors 1209 and 1210, threshold determiners 1211 and 1212, and dot determiners 1213 and 1214.

Figure 22:
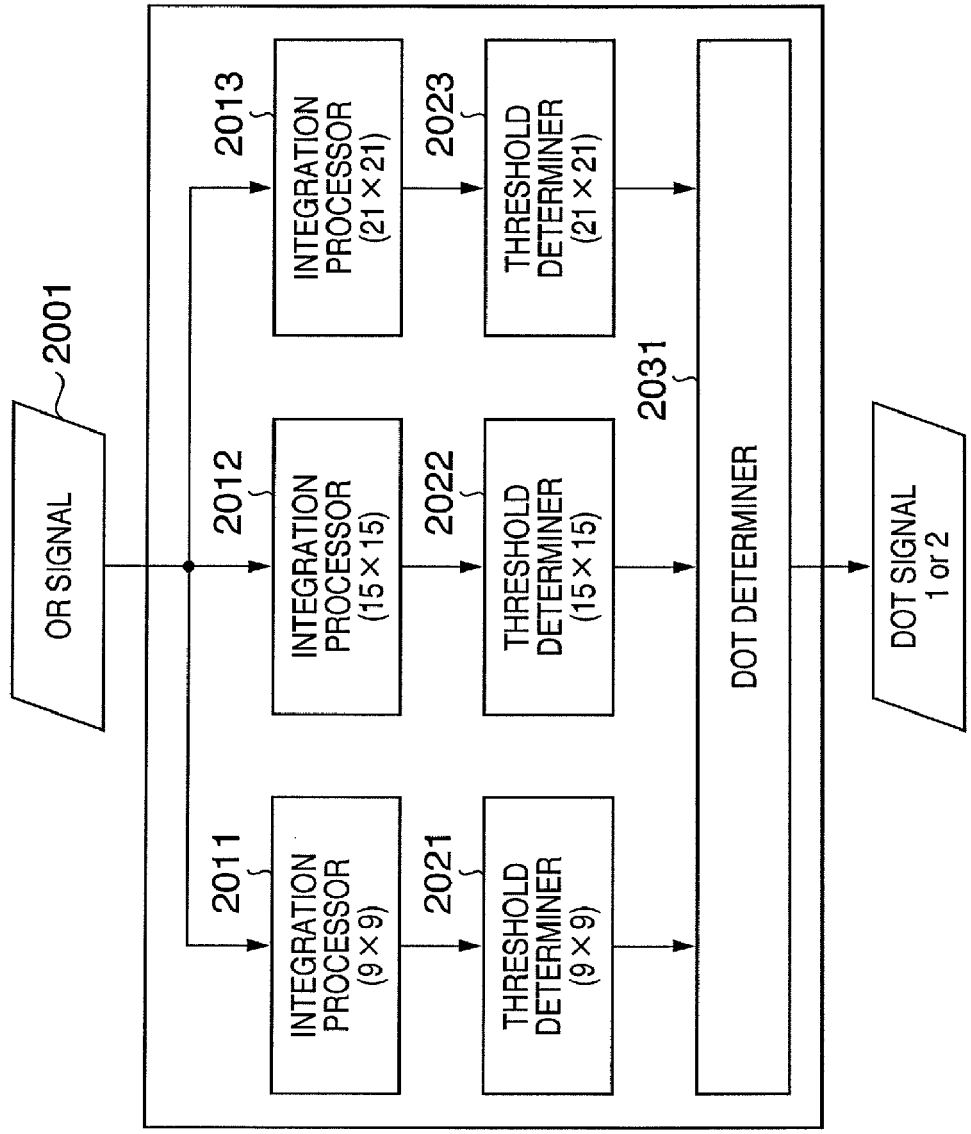
FIG. 22 is a diagram for explaining the process for generating a dot signal by an integration processor, a threshold determiner, and the dot determiner.

FIG. 22 is a diagram showing the process for generating dot signal 1 or 2 by the integration processor 1209 (or 1210), threshold determiner 1211 (or 1212), and dot determiner 1213 (or 1214).

OR signals 2001 are integrated in a plurality of areas. For example, integration processors 2011, 2012, and 2013 respectively count (integrate) the numbers of pixels with OR signals='1' within 9×9, 15×15, and 21×21 pixel areas. The count values output from the integration processors are input to threshold determiners 2021, 2022, and 2023, which respectively perform determination within 9×9, 15×15, and 21×21 pixel areas. Note that the thresholds of the threshold determiners 2021, 2022, and 2023 can be respectively set. A dot determiner 2031 receives determination signals output from the respective threshold determiners, and outputs a dot signal.

Figure 23:
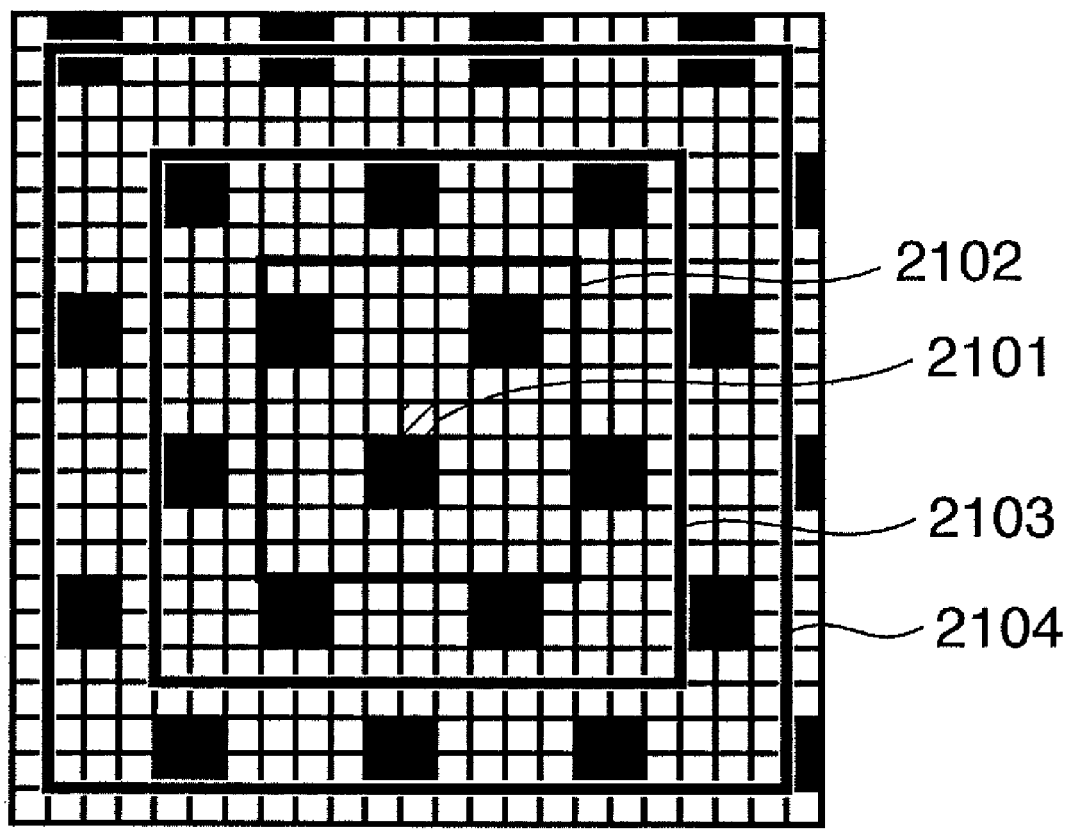
FIG. 23 is a view for explaining the processing of the integration processor.

FIG. 23 is a view for explaining the processing of the integration processors 2011 to 2013, and shows OR signals of a low-density dot part, in which an OR signal='1' is indicated by black pixel, and an OR signal='0' is indicated by a white pixel. In the example of this embodiment, OR signals are integrated within three integration areas. However, the present invention is not limited to the three integration areas.

When OR signals having a pixel of interest 2101 in the state shown in FIG. 23 are integrated (by counting pixels of OR signals='1') within a 9×9 pixel area 2102, a 15×15 pixel area 2103, and a 21×21 pixel area 2104, the following results are obtained:

12 pixels in the 9×9 pixel area 2102;
40 pixels in the 15×15 pixel area 2103; and
76 pixels in the 21×21 pixel area 2104.

Each of the threshold determiners 2021 to 2023 determines that the pixel of interest 2101 falls within a halftone dot region when the area of the pixels of OR signals='1' within the corresponding area exceeds, e.g., 5%; and it determines that the pixel of interest 2101 does not fall within a halftone dot area when the area is, e.g., 5% or less. Therefore, the thresholds required to determine the respective integration areas as a halftone dot region are as follows:

the threshold for the 9×9 pixel area is 5 pixels or more;
that for the 15×15 pixel area is 12 pixels or more; and
that for the 21×21 pixel area is 23 pixels or more.

Therefore, the integration results are determined as follows:

the 9×9 pixel area 2102 is a halftone dot region since 12 pixels>5 pixels;
the 15×15 pixel area 2103 is a halftone dot region since 40 pixels>12 pixels; and
the 21×21 pixel area 2104 is a halftone dot region since 76 pixels>23 pixels.

Figure 24:
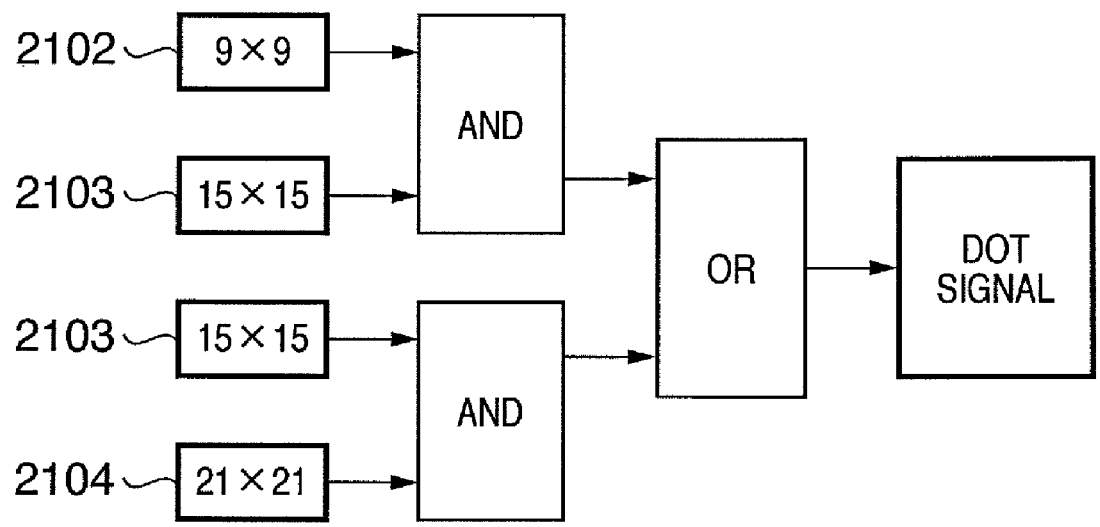
FIG. 24 is a diagram for explaining the processing of the dot determiner.

FIG. 24 is a diagram for explaining the processing of the dot determiner 2031.

The dot determiner 2031 determines based on the determination results of respective integration areas if the pixel of interest 2101 falls within a halftone dot region. Initially, the determination results of respective integration areas are paired. For example, the determination results of the 9×9 pixel area 2102 and the 15×15 pixel area 2103 form one pair, those of the 15×15 pixel area 2103 and the 21×21 pixel area 2104 form another pair, and the ANDS of these pairs are calculated. The ANDS are ORed to generate a dot signal. In the above example, since all the integration areas are determined as a halftone dot region, a dot signal='1' is generated as a result of ANDing and ORing.

Figure 25:
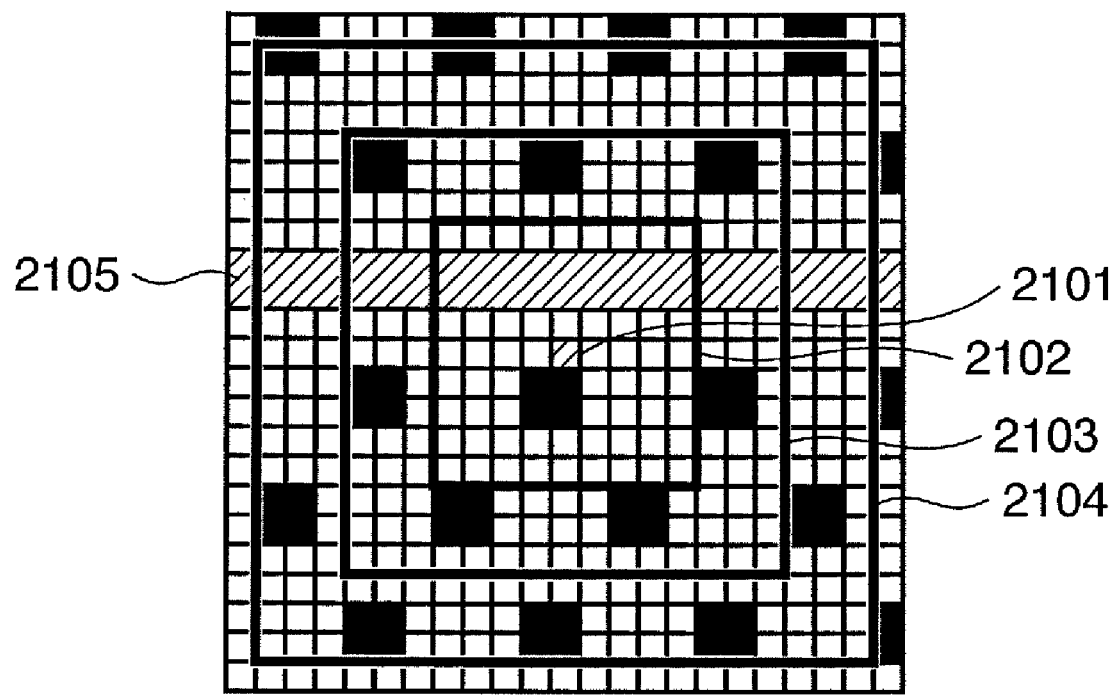
FIG. 25 is a view for explaining the processing of the integration processor when a low-density halftone dot region includes a character edge.

FIG. 25 is a view for explaining the processing of the integration processors 2011 to 2013 when a low-density halftone dot region includes a character edge.

When OR signals having the pixel of interest 2101 as the center in the state shown in FIG. 25 are integrated in the respective integration areas 2102 to 2104 in the same manner as in the description of FIG. 23, the integration results are as follows:

4 pixels in the 9×9 pixel area 2102;
32 pixels in the 15×15 pixel area 2103; and
60 pixels in the 21×21 pixel area 2104.

Therefore, the determination results of the threshold determiners are as follows:

the 9×9 pixel area 2102 is a non-halftone dot region since 4 pixels<5 pixels;
the 15×15 pixel area 2103 is a halftone dot region since 32 pixels>12 pixels; and
the 21×21 pixel area 2104 is a halftone dot region since 60 pixels>23 pixels.

The dot determiner 2031 performs logical operations shown in FIG. 24, and the AND result of the pair of the 9×9 pixel area 2102 and the 15×15 pixel area 2103 yields '0'. On the other hand, the AND result of the pair of the 15×15 pixel area 2103 and the 21×21 pixel area 2104 yields '1'. Hence, as a result of ORing these AND results, a dot signal='1' is generated.

In this manner, the determination result of one integration area (9×9 pixel area 2102 in this case) indicates a non-halftone dot region. In other words, a halftone dot region including a character or line drawing may be determined as a non-halftone dot region depending on the size and threshold of the integration area. Hence, when a plurality of integration areas with different sizes, and different thresholds are used, a halftone dot region including a character or line drawing can be correctly detected as a halftone dot region.

Figure 26:
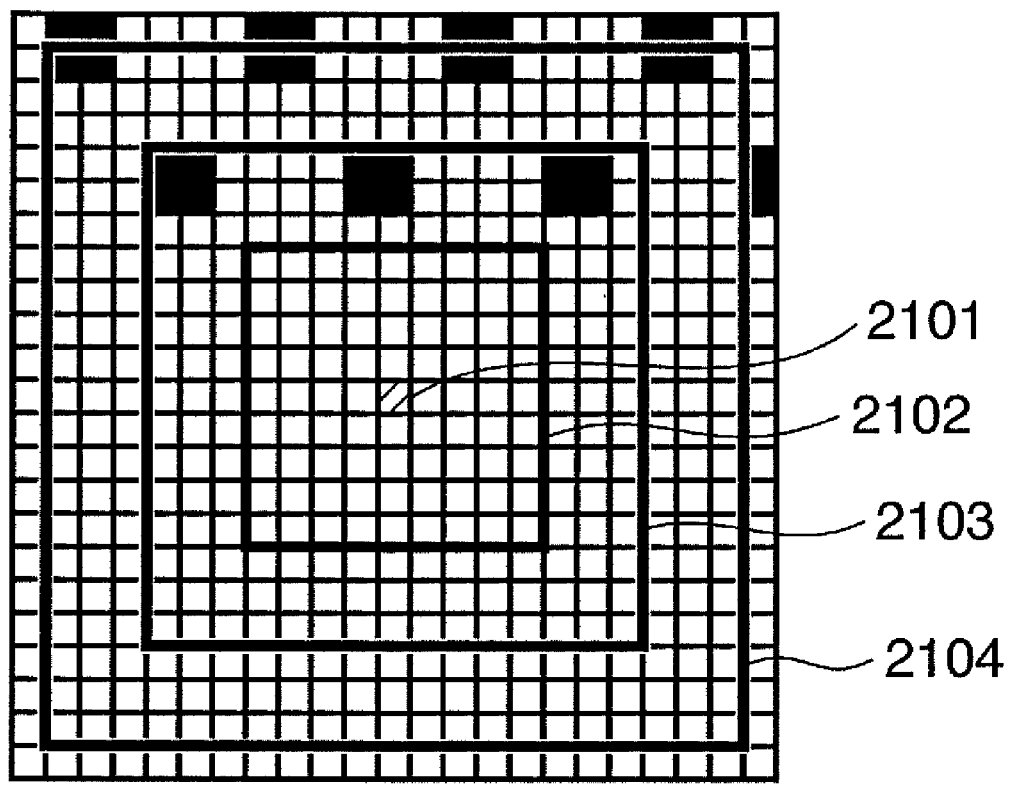
FIG. 26 is a view for explaining the processing of the integration processor when an interest pixel is located outside a low-density halftone dot region.

FIG. 26 is a view for explaining the processing of the integration processors 2011 to 2013 when the pixel of interest 2101 is located outside a low-density halftone dot region.

When OR signals having the pixel of interest 2101 as the center in the state shown in FIG. 26 are integrated in the respective integration areas 2102 to 2104 in the same manner as in the description of FIG. 23, the integration results are as follows:

0 pixel in the 9×9 pixel area 2102;
12 pixels in the 15×15 pixel area 2103; and
20 pixels in the 21×21 pixel area 2104.

Therefore, the determination results of the threshold determiners are as follows:

the 9×9 pixel area 2102 is a non-halftone dot region since 0 pixel<5 pixels;
the 15×15 pixel area 2103 is a halftone dot region since 12 pixels=12 pixels; and
the 21×21 pixel area 2104 is a non-halftone dot region since 20 pixels<23 pixels.

The dot determiner 2031 performs logical operations shown in FIG. 24, and the AND result of the pair of the 9×9 pixel area 2102 and the 15×15 pixel area 2103 yields '0'. On the other hand, the AND result of the pair of the 15×15 pixel area 2103 and the 21×21 pixel area 2104 also yields '0'. Hence, as a result of ORing these AND results, a dot signal='0' is generated.

In this way, using a plurality of integration areas having different sizes, and different threshold values, a part outside the boundary of the halftone dot region can be detected as a non-halftone dot region. That is, expansion of the extraction results (ballooning of dot signals) of a halftone dot region, which occurs when the integration area is expanded to improve the determination precision, can be prevented.

The aforementioned combinations of the integration areas and thresholds are merely an example, and integration areas with sizes and thresholds can be combined according to the feature of a halftone dot area to be detected. Also, in the above example, two ANDS are calculated using the three integration areas. However, the number of integration areas, and the configuration of logical operations can be arbitrarily determined. Furthermore, the combinations of ANDing and ORing are merely an example.

Note that in a system from the OR processor 1207 to the dot determiner 1213, and that from the OR processor 1208 to the dot determiner 1214, the sizes of respective integration areas, the combinations of integration areas, and thresholds are changed to determine an image region, and dot signals 1 and 2 are output. In the subsequent processing, one of these dot signals is used, or the two dot signals are ANDed or ORed to broaden the determination range of a halftone dot region.

[Switching of Image Processing]

Using text signals and dot signals obtained by the region segmentation processing, image region attributes are determined as follows. Image processes (masking, UCR, edge emphasis or smoothing, color reproduction method, image formation method, and the like) can be adaptively switched (controlled) in accordance with the image region attributes.

| Dot signal | 0 | 0 | 0 | 1 |
|---|---|---|---|---|
| Text signal | 0 | 0 | 0 | 1 |
| Region attribute | — | text | dot | *1 |

*1: a character within a halftone dot region.

In this way, the isolation amounts are integrated in a plurality of integration areas, and first dot determination is done using different thresholds for these integration areas. Furthermore, a plurality of first dot determination results undergo logical operations to execute second dot determination. In this way, a halftone dot region which includes a character, line drawing, or an image of dust or contamination can be correctly detected as a halftone dot region. In addition, when the integration area is expanded, ballooning of dot signals which occurs at the boundary of a halftone dot region which contacts a white background can be prevented.

Second Embodiment

Image processing according to the second embodiment of the present invention will be described below. Note that the same reference numerals in the second embodiment denote the same parts as those in the first embodiment, and a detailed description thereof will be omitted.

The first embodiment has exemplified a case wherein the isolation amount assumes a binary value (1 bit). However, the second embodiment will explain a case wherein the isolation amount assumes a multi-value.

Figure 27:
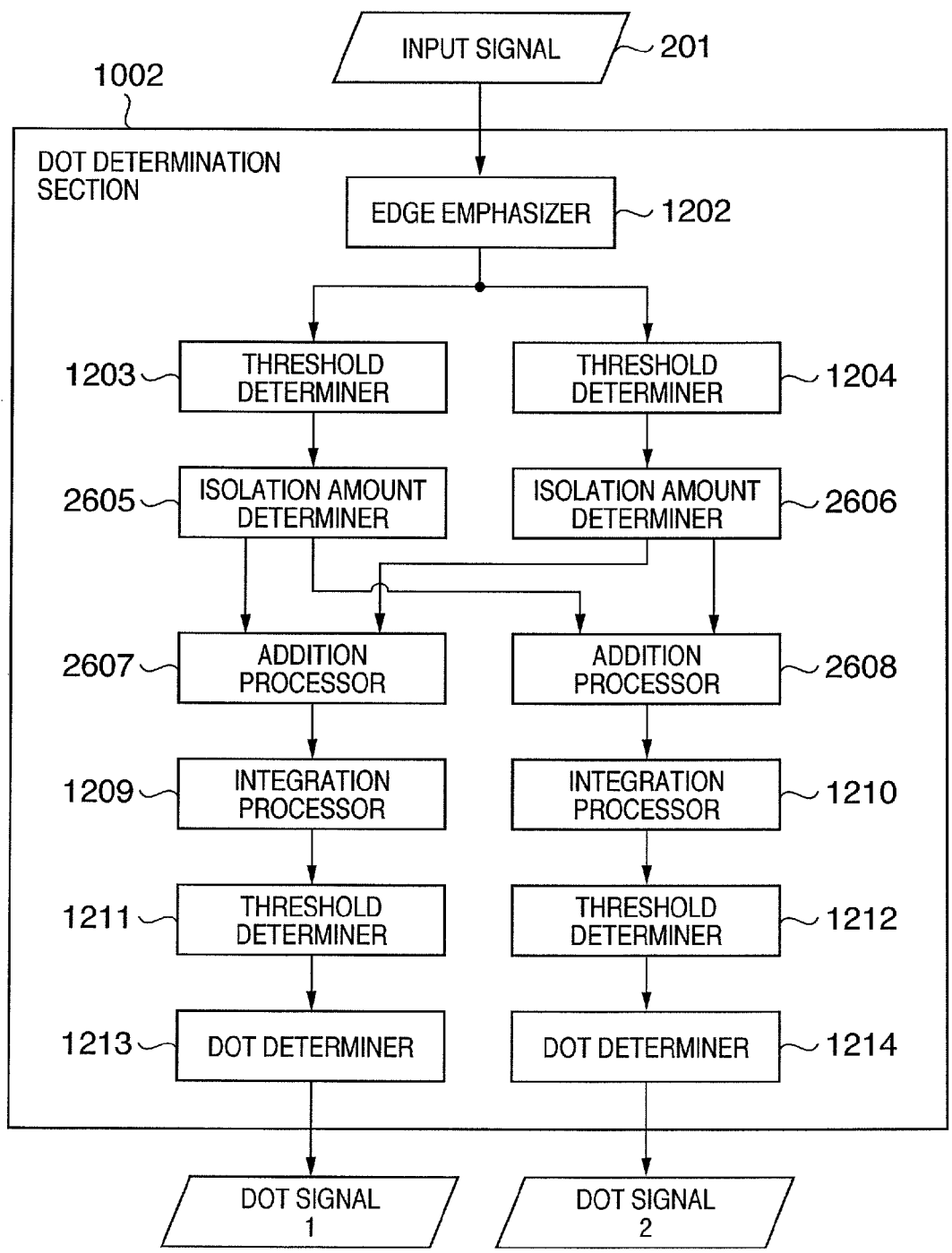
FIG. 27 is a block diagram showing the arrangement of a dot determiner according to the second embodiment.

FIG. 27 is a block diagram showing the arrangement of a dot determination section 1002 of the second embodiment.

The dot determination section 1002 of the second embodiment has the same basic arrangement as that in the first embodiment, but it comprises isolation amount determiners 2605 and 2606 which output multi-valued isolation amounts, and addition processors 2607 and 2608 which replace the OR processors 1207 and 1208 of the first embodiment. Only components different from the first embodiment will be explained below.

The isolation amount determiner 2605 performs pattern matching for inner edge signals using a plurality of patterns and detects a dot.

FIGS. 28A to 28D are views for explaining isolation amount calculations of the second embodiment, and show the relationship between inner edge signals in a 4×4 pixel area and the isolation amount of an interest pixel 1701.

Figure 28A:
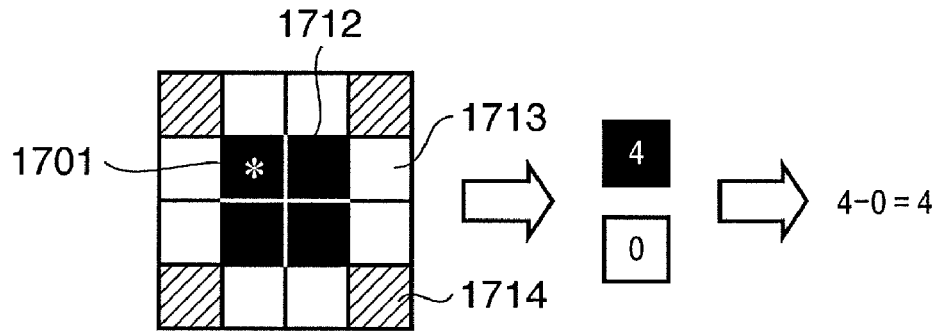
FIGS. 28A to 28D are views for explaining isolation amount calculations of the second embodiment.

In FIG. 28A, since the number of pixels (those with inner edge signals='1') that match black pixels 1712 is four, and the number of pixels (those with inner edge signals='0') that match white pixels 1713 is zero, the isolation amount of the interest pixel 1701 is 4−0=4.

Figure 28B:
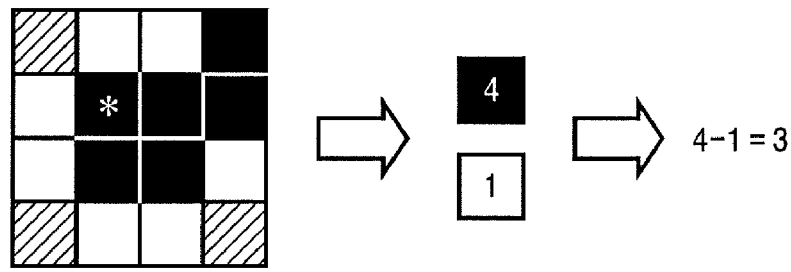

In FIG. 28B, since the number of pixels that match black pixels 1712 is four, and the number of pixels that match white pixels 1713 is one, the isolation amount of the interest pixel 1701 is 4−1=3.

Figure 28C:
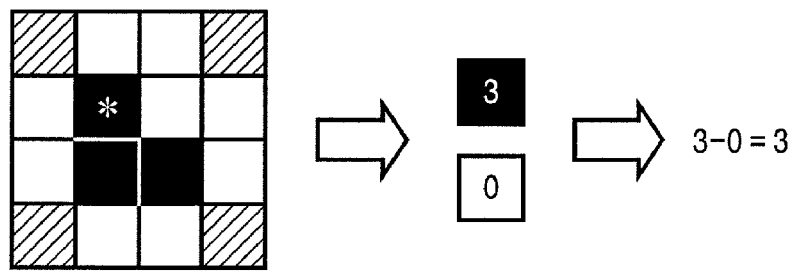

In FIG. 28C, since the number of pixels that match black pixels 1712 is three, and the number of pixels that match white pixels 1713 is zero, the isolation amount of the interest pixel 1701 is 3−0=3.

Figure 28D:
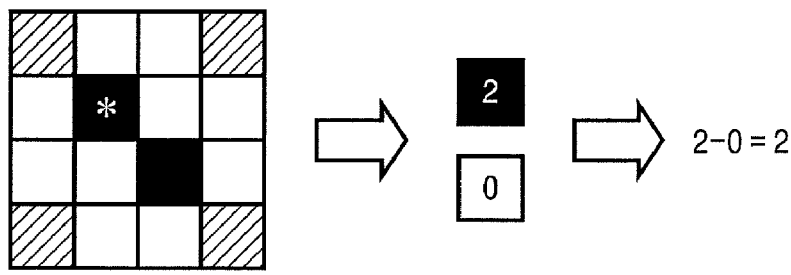

In FIG. 28D, since the number of pixels that match black pixels 1712 is two, and the number of pixels that match white pixels 1713 is zero, the isolation amount of the interest pixel 1701 is 2−0=2.

That is, the isolation amount of the second embodiment is obtained as a difference between the number of pixels which should be '1', and the number of pixels which should be '0'.

The isolation amount determiner 2605 performs such pattern matching using a plurality of patterns. Also, the isolation amount determiner 2606 that performs isolation determination of outer edge signals performs the same pattern matching as the isolation amount determiner 2605. In this case, the matching patterns can be arbitrarily adjusted and set.

The addition processors 2607 and 2608 receive and add both the isolation amounts output from the isolation amount determiners 2605 and 2606. In this case, the two addition processors add the isolation amounts of identical patterns. Each addition processor uses a pattern which is not a pattern to be added of the other addition processor as a pattern to be added. For example, when the addition processor 2607 handles a pattern used to detect a coarse halftone dot region (with a low LPI), the addition processor 2608 handles a pattern used to detect a fine halftone dot region (with a high LPI).

In this way, by handling multi-valued isolation amounts, the detection precision of a halftone dot region can be further improved.

Modification of Embodiments

The second embodiment uses the matching level for a given matching pattern as a criterion for calculating the multi-valued isolation amount. However, the number of matched patterns may be used as an isolation amount. For example, when the isolation amount determiners 2605 and 2606 use 10 different matching patterns, the isolation amount=10 is output when all these patterns are matched, or the isolation amount=3 is output when three patterns are matched.

According to the above embodiment, the extraction performance of a halftone dot region including a character or line drawing can be improved without increasing any determination errors. Also, ballooning of extraction results at the boundary of a halftone dot region that contacts a white background can be prevented. Therefore, image processing adapted for attributes of image regions obtained by suited region segmentation can be executed, thus improving image quality.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252466, filed Aug. 31, 2005, which is hereby incorporated by reference herein in its entirety.

The invention claimed is:

1. A method of extracting image regions from an image including different types of image regions, comprising:
using a processor to perform the steps of:
generating an edge-emphasized image by applying an edge-emphasis process to an input image;
setting an inner edge signal of a pixel of the edge-emphasized image to an affirmative value when a value of the pixel is greater than a first threshold value, and setting an outer edge signal of a pixel of the edge-emphasized image to an affirmative value when a value of the pixel is less than a second threshold value, wherein the first threshold value is positive and the second threshold value is negative;
determining whether an OR signal of each pixel is set to an affirmative value or not based on the inner and outer edge signals of each pixel;
counting a first number of pixels having the affirmative OR signal in an area which includes a pixel of interest and has a first pixel size so as to compare the counted first number with a third threshold value;
counting a second number of pixels having the affirmative OR signal in an area which includes the pixel of interest and has a second pixel size larger than the first pixel size so as to compare the counted second number with a fourth threshold value; and
determining whether or not the pixel of interest belongs to a halftone dot region based on the comparison results in the first and second counting steps.

2. The method according to claim 1, wherein the first determining step comprises:
a first step of setting a first isolation amount determination signal of each pixel to an affirmative value when a pattern represented by the inner edge signals of that pixel and pixels surrounding that pixel matches a first predetermined pattern;
a second step of setting a second isolation amount determination signal of each pixel to an affirmative value when a pattern represented by the outer edge signals of that pixel and pixels surrounding that pixel matches a second predetermined pattern; and
a third step of determining that the OR signal of the pixel of interest is the affirmative value when at least one of the first and second isolation amount determination signals of the pixel of interest and pixels surrounding the pixel of interest is affirmative.

3. The method according to claim 2, wherein in the first step, if it has three and more pixels having the affirmative inner edge signal in four pixels placed in a center of a 4×4 pixel area which includes the pixel of interest and pixels surrounding the pixel of interest, and if it has six and more pixels having the negative inner edge signal in eight pixels placed in sides of the 4×4 area without corners, the first isolation amount determination signal of the pixel of interest is set to the affirmative value.

4. The method according to claim 1, further comprising the step of counting a third number of pixels having the affirmative OR signal in an area which includes the pixel of interest and has a third pixel size larger than the second pixel size so as to compare the counted third number with a fifth threshold value,
wherein in the second determining step, an AND result of the comparison results of the first and second counting steps is computed, an AND result of the comparison results of the second and third counting steps is computed, an OR result of the AND results is computed, and it is determined that the pixel of interest belongs to the halftone dot region when the OR result is affirmative.

5. An image processing apparatus for extracting image regions from an image including different types of image regions, comprising:
a generator configured to generate an edge-emphasized image by applying an edge-emphasis process to an input image;
a setter configured to set an inner edge signal of a pixel of the edge-emphasized image to an affirmative value when a value of the pixel is greater than a first threshold value, and to set an outer edge signal of a pixel of the edge-emphasized image to an affirmative value when a value of the pixel is less than a second threshold value, wherein the first threshold value is positive and the second threshold value is negative;
a first determiner configured to determine whether an OR signal of each pixel is set to an affirmative value or not based on the inner and outer edge signals of each pixel;
a first comparator configured to count a first number of pixels having the affirmative OR signal in an area which includes a pixel of interest and has a first pixel size so as to compare the counted first number with a third threshold value;
a second comparator configured to count a second number of pixels having the affirmative OR signal in an area which includes the pixel of interest and has a second pixel size larger than the first pixel size so as to compare the counted second number with a fourth threshold value; and
a second determiner configured to determine whether or not the pixel of interest belongs to a halftone dot region based on the comparison results of the first and second comparators.

6. A computer-readable storage medium storing a computer-executable program for causing a computer to perform a method of extracting image regions from an image including different types of image regions, the method comprising the steps of:
generating an edge-emphasized image by applying an edge-emphasis process to an input image;
setting an inner edge signal of a pixel of the edge-emphasized image to an affirmative value when a value of the pixel is greater than a first threshold value, and setting an outer edge signal of a pixel of the edge-emphasized image to an affirmative value when a value of the pixel is less than a second threshold value, wherein the first threshold value is positive and the second threshold value is negative;
determining whether an OR signal of each pixel is set to an affirmative value or not based on the inner and outer edge signals of each pixel;
counting a first number of pixels having the affirmative OR signal in an area which includes a pixel of interest and has a first pixel size so as to compare the counted first number with a third threshold value;
counting a second number of pixels having the affirmative OR signal in an area which includes the pixel of interest and has a second pixel size larger than the first pixel size so as to compare the counted second number with a fourth threshold value; and
determining whether or not the pixel of interest belongs to a halftone dot region based on the comparison results in the first and second counting steps.

* * * * *